United States Patent [19]
Amit

[11] Patent Number: 5,384,899
[45] Date of Patent: Jan. 24, 1995

[54] APPARATUS AND METHOD FOR EMULATING A SUBSTRATE

[75] Inventor: Gad Amit, Tel Aviv, Israel

[73] Assignee: Scitex Corporation Ltd., Herzliya, Israel

[21] Appl. No.: 685,904

[22] Filed: Apr. 16, 1991

[51] Int. Cl.$^6$ .............................................. G06F 15/62
[52] U.S. Cl. ........................................ 395/100; 364/578
[58] Field of Search ............. 395/100, 118, 155, 161, 395/159; 340/706, 707, 709, 723; 364/550, 551.01, 555, 578; 345/114, 121, 132

[56] References Cited

U.S. PATENT DOCUMENTS

| | | | |
|---|---|---|---|
| 4,514,818 | 4/1985 | Walker | 395/129 |
| 4,633,416 | 12/1986 | Walker | 340/703 |
| 4,949,286 | 8/1990 | Ohba | 395/125 |
| 4,970,666 | 11/1990 | Welsh et al. | 395/126 |
| 5,060,169 | 10/1991 | Khosla | 395/129 |

FOREIGN PATENT DOCUMENTS

| | | |
|---|---|---|
| 2089625 | 6/1982 | United Kingdom . |
| 2113950 | 8/1983 | United Kingdom . |
| 2140257 | 11/1984 | United Kingdom . |

OTHER PUBLICATIONS

W. H. Press et al., "Numerical Recipes in C: ...", The Press Syndicate of the University of Cambridge, Cambridge, England, Chapter 7, 1988.

D. Small, "Simulating Watercolor by Modeling Diffusion Pigment and Paper Fibers", Image Handling and Reproduction Systems Integration. SPIE Th Inter. Soc. for Optical Ingineering.

J. P. Lewis, "Texture Synthesis for Digital Painting". Computer Graphics. Siggraph '84 vol. 18, No. 3, Jul. 1984, USA. pp. 245–252.

Primary Examiner—Heather R. Herndon
Attorney, Agent, or Firm—Ladas & Parry

[57] ABSTRACT

A method for creating an emulation of a substrate, the method including generating and storing a digital representation of a first feature of a substrate, manipulating the digital representation of the first feature for producing a digital representation of a second feature of the substrate, and repeating the storing and manipulating, thereby emulating a plurality of features of the substrate, wherein the generating includes generating a random pattern.

50 Claims, 18 Drawing Sheets (7 of 18 Drawing(s) in Color)

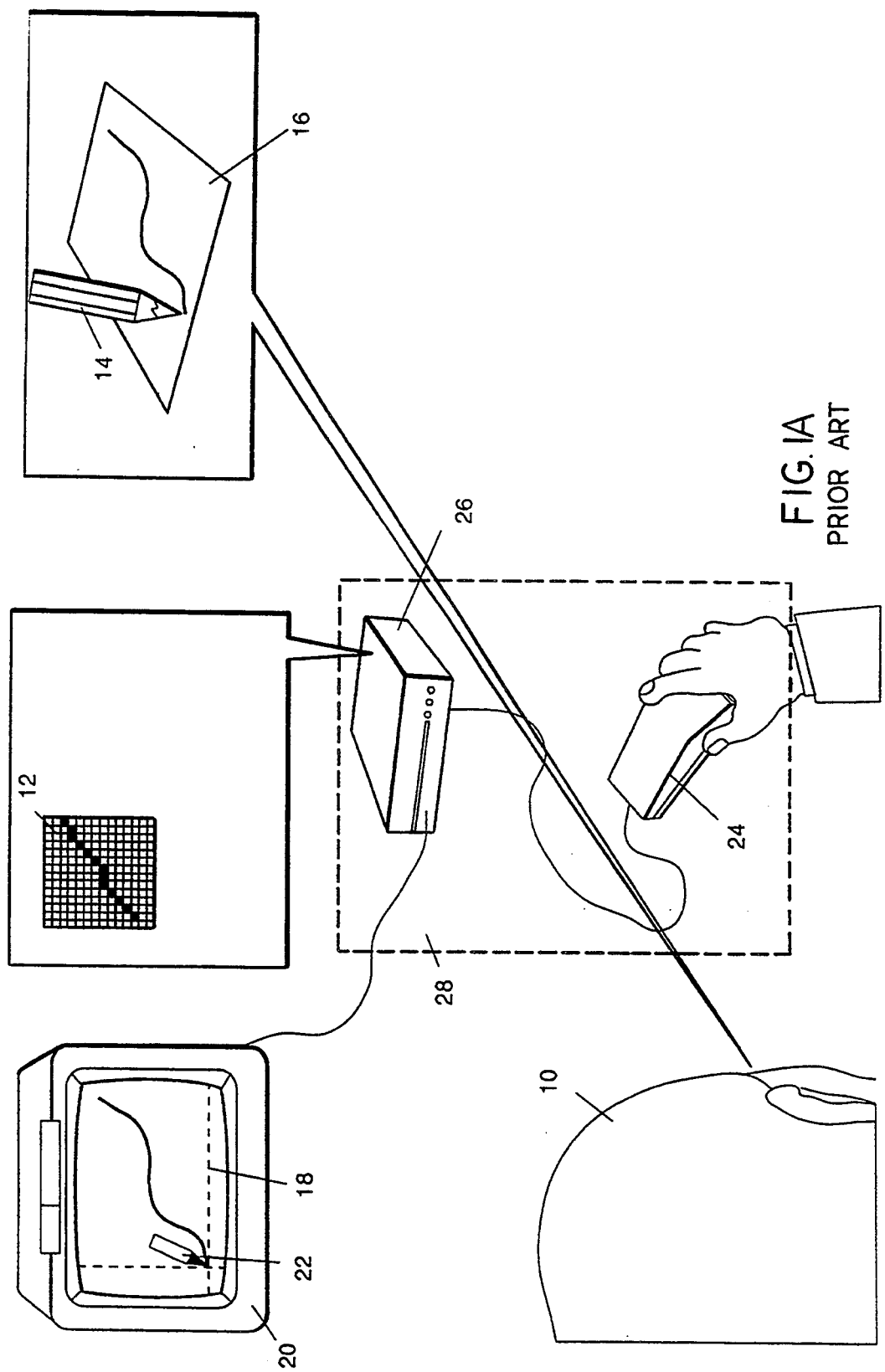
FIG. IA
PRIOR ART

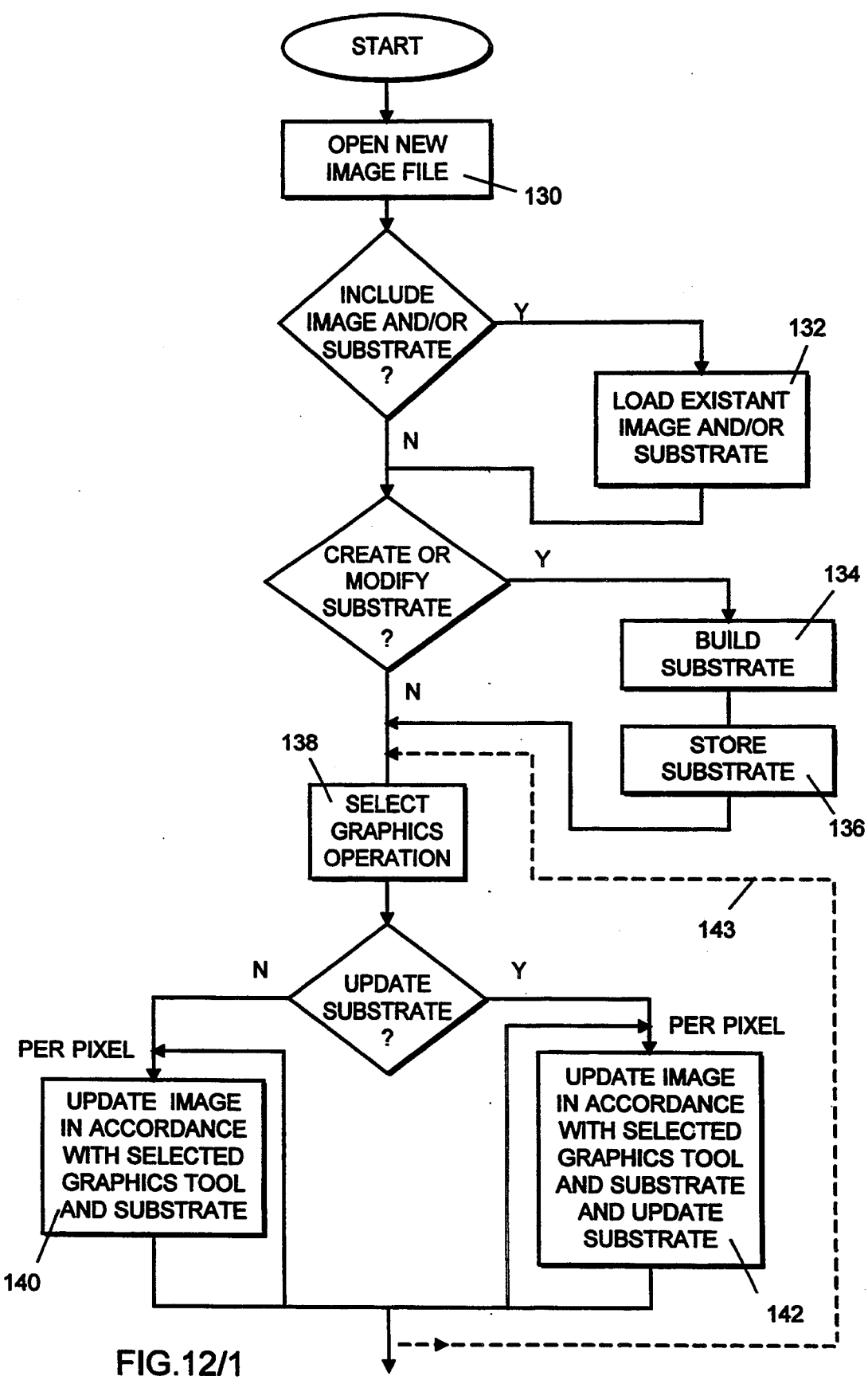
FIG.12/1

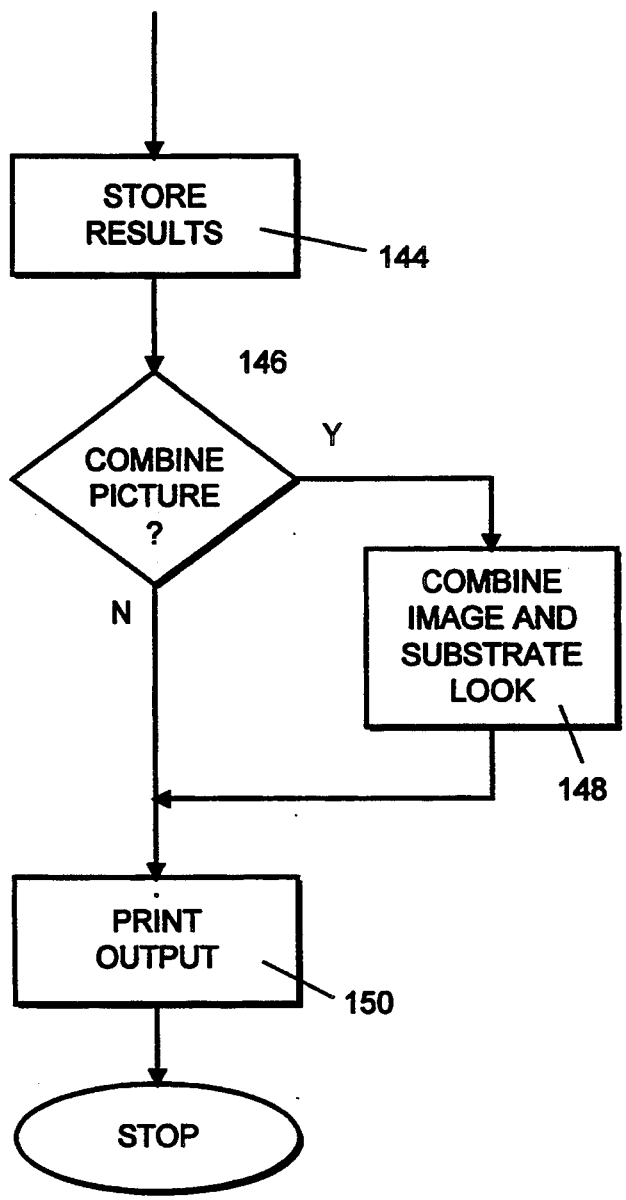
FIG.12/2

APPARATUS AND METHOD FOR EMULATING A SUBSTRATE

FIELD OF THE INVENTION

The present invention relates to electronic and computerized graphics systems generally.

BACKGROUND OF THE INVENTION

Electronic and computerized graphics systems are known. in the art. Typically, they offer a user the ability to produce a color image and from the image, to produce s picture which can either be printed via a color reproduction system, such as a plotter or a printer, displayed on a video screen or saved in memory.

It will be noted that in the context of the present specification, an "image" is a graphical creation created by a user within a computerized graphics system and a "picture" is a visual two-dimensional representation of the image.

The image can be produced through a number of methods as follows:

a) An image can be created graphically within the graphics system, as illustrated in FIG. 1A. The creation process emulates, in the mind of an operator 10, the process of creating an image 12 by moving an artistic tool 14, such as a pen, pencil, paintbrush, etc., along a surface 16. In reality, the operator 10 operates on a picture 18, or representation, of image 12 which is displayed on a display device 20. There is no picture of the surface 16; rather, the image 12 is produced on a plain, typically white background.

The creation operation is performed typically via manipulation of a cursor manipulation device 24, operating in conjunction with a computing device 26, which manipulation produces movement of an icon 22 on display device 20. Together, the devices 24 and 26 are operative to emulate a plurality of artistic tools 14 and as such form a tool emulating system 28, denoted with a dotted line. Each emulated tool has its own properties, such as the thickness of the line which it will draw, and its location and tool type are represented on device 20 via a representative icon 22. The emulated tool is a software entity and therefore is not shown in the Figure. Through manipulation of the emulated tool, image 12 is created or modified.

The emulated tool is operative to emulate the "look and feel" of standard artistic tools 14 such as paint brushes, pieces of chalk, and even human fingers (in an emulated tool known as "smudge"). The term "artistic tools" refers hereinafter to physical tools used to create a piece of art.

For example, GB Patents 2,140,257 and 2,089,625 describe a video image creation system which emulates the feel of an artistic tool 14 as well as many aspects of a color medium it carries.

The cursor manipulation device 24 can be a mouse, a stylus or a puck, which interactively acts in real time. Activation of the device 24 can occur for as long as the user presses on a button, or buttons, of the tool, or the device 24 can trigger on or off the action of icon 22. For some devices 24, such as the SP300 stylus of Wacom of Tokyo, Japan, the button is operative to give a graduated response wherein the depth the button is pressed affects certain parameters of the graphics tool. Typically, the device 24 is connected to a graphics work-station.

b) A new image can be created from a previous image via graphical manipulations on the previous image. The previous image can be one which was created graphically or one which was received from a scanning system.

c) Two images can be merged together and then manipulated graphically. This method often entails use of masks for masking those portions of one of the images which are not to be combined with the other image. Limits are also utilized, in conjunction with masks, to define areas of the resultant image where an icon cannot operate.

Masks are typically defined by the amount of interaction between the images to be merged which is allowed. A "hard" mask is a binary mask which simply omits that which is masked out and includes all the rest. A "soft" mask is a typically multiple bit mask which defines a multiplicity of levels of interaction. Thus, the extent to which a pixel of one image is omitted depends on the intensity value of the corresponding pixel in the soft mask.

Masks and apparatus for implementing them are described in detail in GB Patents 2,157,122 and 2,113,950.

A graphics system can produce images in either the vector or bitmap format. In vector format, objects in the image are mathematically defined as geometric shapes, such as squares, lines, triangles, circles etc. Each object can be given graphic characteristics such as color, and the order in which the objects are defined is saved. A bitmap image processor is utilized to produce the representation 18 of the image on the display 20, which is in bitmap format. As is known in the art, the resolution of the bitmap produced by the bitmap image processor is matched to the characteristics of the output device, whether it be a display device, such as a monitor, a printing device, or a transmission device for transmitting the picture to a receiving device, such as a television screen or a facsimile.

In bitmap format, the entire picture is saved as a collection of individual picture elements, or pixels, wherein each pixel has a given color There are no relationships among the pixels and the resolution of the bitmap is fixed.

Some graphics systems include various ones of the elements outlined hereinabove. All such systems enable a user to produce an image from an already existent image through graphic manipulation of the image using graphics tools such as masks and/or icons.

Examples of graphics application software useful in electronic and computerized graphics systems are the Adobe Photoshop, a bitmap-based software package, and the Adobe Illustrator, a vector-based software package, both manufactured by Adobe Systems Incorporated of Mountain View, Calif., U.S.A., and the Pixel Paint manufactured by Supermac Technology of Sunnyvale, Calif., U.S.A. All of the programs operate on the Apple Macintosh personal computer manufactured by Apple Computers Inc. of Cupertino, Calif., U.S.A.

Other types of computerized graphics systems include Computer Aided Visualization (CAV) systems. Operators of CAV systems create three-dimensional objects, defined in the vector format, and then imitate the look of the object in as realistic a manner as possible using rendering techniques. The technique producing the most realistic results is ray tracing.

In ray tracing, the paths of all the light rays impinging on a surface are traced in order to calculate the total light illuminating each point on that surface. The interaction of the ray and the surface of the object is calculated, in accordance with the laws of physics, as a function of the angle of the ray, the amount of light which is reflected and/or absorbed by the object and other parameters, such as the color of the object and the color of the light.

Ray tracing calculations are computer-intensive and are therefore, not interactive, nor do they enable real-time operation. The user must build the object or composition of objects to which he must impart characteristics with respect to light, such as color, amount of light it can absorb, etc.. He must also add a light source, with its characteristics, somewhere in the space around the object or objects, and then he must indicate to the system to produce a two-dimensional bitmap of the composition. The system may take a number of hours to produce the bitmap which is a fairly realistic two-dimensional representation of the composition.

Example ray tracing systems are the Stratavision manufactured by Stratavision Inc. of St. George, Utah, U.S.A. and Integrates manufactured by Intergraph Corporation of Huntsville, Ala., U.S.A. Both programs operate on the Apple Macintosh.

There also exist software packages which impart the physical and aesthetic characteristics of a given material to a three-dimensional object for later ray tracing.

There has been an effort, in the prior art, to produce images which closely match reality whether by matching the qualities of the emulated tools to those of artistic tools or by defining the properties of a geometrical composition.

However, the current state of the art does not consider how a physical substrate, such as smooth paper, cloth, or a fibrous material, affects the look of an image. Rather, all images are represented as having no physical substrate. Artists and the like understand that substrates affect the look of the image and therefore, choose their substrates carefully.

Similarly, the physical properties of the medium giving color to the image affect the appearance of the final picture or painting. Typical media giving color to an image are water-based and oil-based paints, charcoal, crayons, colored pencils, etc. Properties of each medium, such as mass, volume, color, fluidity, granularity, drying speed and hardness when dried, vary among different media.

SUMMARY OF THE INVENTION

It is therefore an object of the present invention to provide a method and apparatus for computerized emulation of the cooperation of an image with a substrate.

This can be produced by emulating the physical interactions between an artistic tool and a substrate upon which a user wishes to work, in which case the interaction is typically performed in real time.

Furthermore, it is an object of the present invention to provide a method and apparatus for computerized emulation of the physical qualities of media giving color to an image as well as their interactions with a substrate.

There is therefore provided, in accordance with an embodiment of the present invention, apparatus for emulating a graphic product formed of an image created on a substrate wherein the substrate generally affects the look of the image. The apparatus includes apparatus for providing the image, apparatus for providing an emulated version of the substrate and emulation apparatus, utilizing the emulated version of the substrate, for emulating cooperation of the substrate and the image, thereby to produce an emulated version of the graphic product.

There is further provided, in accordance with an embodiment of the present invention, apparatus for emulating cooperation of a substrate and a selected artistic tool including apparatus for enabling at least one feature of the substrate to be characterized and apparatus, utilizing the at least one feature, for emulating the interaction of the substrate with the selected artistic tool.

There is still further provided, in accordance with an embodiment of the present invention, apparatus for emulating a substrate including apparatus for enabling at least one feature of the substrate to be characterized and apparatus for storing the at least one feature.

Additionally, in accordance with an embodiment of the present invention, the apparatus for providing an emulated version of the substrate includes apparatus for enabling at least one feature of the substrate to be defined. The emulation apparatus includes apparatus, utilizing the at least one feature, for emulating the interaction of the substrate with at least one selected artistic tool.

Moreover, in accordance with an embodiment of the present invention, the apparatus for emulating the interaction includes apparatus for modifying the at least one feature as a result of the emulated interaction of the artistic tool with the substrate. The at least one feature preferably includes a visual representation of the substrate.

Further, in accordance with an embodiment of the present invention, the apparatus of the present invention includes apparatus for combining the visual representation of the substrate with the image thereby to produce the emulated version of the graphic product.

Still further, in accordance with an embodiment of the present invention, the emulation apparatus include apparatus for emulating the cooperation of at least one color medium and the substrate.

Additionally, in accordance with an embodiment of the present invention, the apparatus fop providing the image is a scanner. Alternatively, the apparatus fop providing the image includes image creation apparatus and wherein the image creation apparatus cooperate with the emulation apparatus to create the emulated version of the graphic product.

Furthermore, in accordance with an embodiment of the present invention, the image creation apparatus includes apparatus fop defining a tool footprint and apparatus fop providing the tool footprint to the emulation apparatus fop every pixel of the image.

Still further, in accordance with an embodiment of the present invention, the emulation apparatus includes apparatus for providing the result of the emulation to the image creation apparatus thereby to include the emulation in the image.

Moreover, in accordance with an embodiment of the present invention, the apparatus fop defining includes image processing apparatus.

Additionally, in accordance with an embodiment of the present invention, the apparatus of the present invention includes apparatus for providing the emulated version of the graphic product to an output device. The output device can be a printer, a storage device, a transmission device or any other suitable device.

There is further provided, in accordance with an embodiment of the present invention, a method fop emulating a graphic product formed of an image created on a substrate wherein the substrate affects the look of the image. The method includes the steps of providing the image, providing an emulated version of the substrate and emulating cooperation of the substrate and the image by utilizing the emulated version of the substrate, thereby to produce an emulated version of the graphic product.

There is additionally provided, in accordance with an embodiment of the present invention, a method for emulating cooperation of a substrate and a selected artistic tool including the steps of enabling at least one feature of the substrate to be characterized and emulating the interaction of the substrate with the selected artistic tool by utilizing the at least one feature.

There is also provided, in accordance with an embodiment of the present invention, a method for emulating a substrate including the steps of enabling at least one feature of the substrate to be characterized and storing the at least one feature.

Additionally, in accordance with an embodiment of the present invention, the step of providing an emulated version of the substrate includes the step of enabling at least one feature of the substrate to be defined and wherein the step of emulating includes the step of utilizing the at least one feature for emulating the interaction of the substrate with at least one selected artistic tool.

Further, in accordance with an embodiment of the present invention, the step of emulating includes the step of modifying the at least one feature as a result of the emulated interaction of the artistic tool with the substrate. The at least one feature preferably includes a visual representation of the substrate.

Still further, in accordance with an embodiment of the present invention, the method of the present invention additionally includes the step of combining the visual representation of the substrate with the image thereby to produce the emulated version of the graphic product.

Moreover, in accordance with an embodiment of the present invention, the step of emulating the interaction includes the step of emulating the cooperation of at least one color medium and the substrate.

Additionally, in accordance with an embodiment of the present invention, the step of providing the image includes the step of creating the image in conjunction with the step of emulating thereby to create the emulated version of the graphic product. The step of creating the image preferably includes the step of defining a tool footprint and providing the tool footprint for every pixel of the image.

Further, in accordance with an embodiment of the present invention, the step of emulating includes the step of providing the result of the emulation to the image thereby to include the emulation in the image.

Finally, in accordance with an embodiment of the present invention, the method includes the step of providing the emulated version of the graphic product to an output device. The output device can be a printer, storage device, transmission device or any other suitable device.

BRIEF DESCRIPTION OF THE DRAWINGS

The file of this patent contains at least one drawing executed in color, copies of this patent with color drawing(s) will be provided by the Patent and Trademark Office upon request and payment of the necessary fee.

The present invention will be understood and appreciated more fully from the following detailed description taken in conjunction with the drawings in which:

FIG. 12 is a flow chart illustration of the method of operation of the system of FIG. 11.

DETAILED DESCRIPTION OF PRESENT INVENTION

Figure 1:
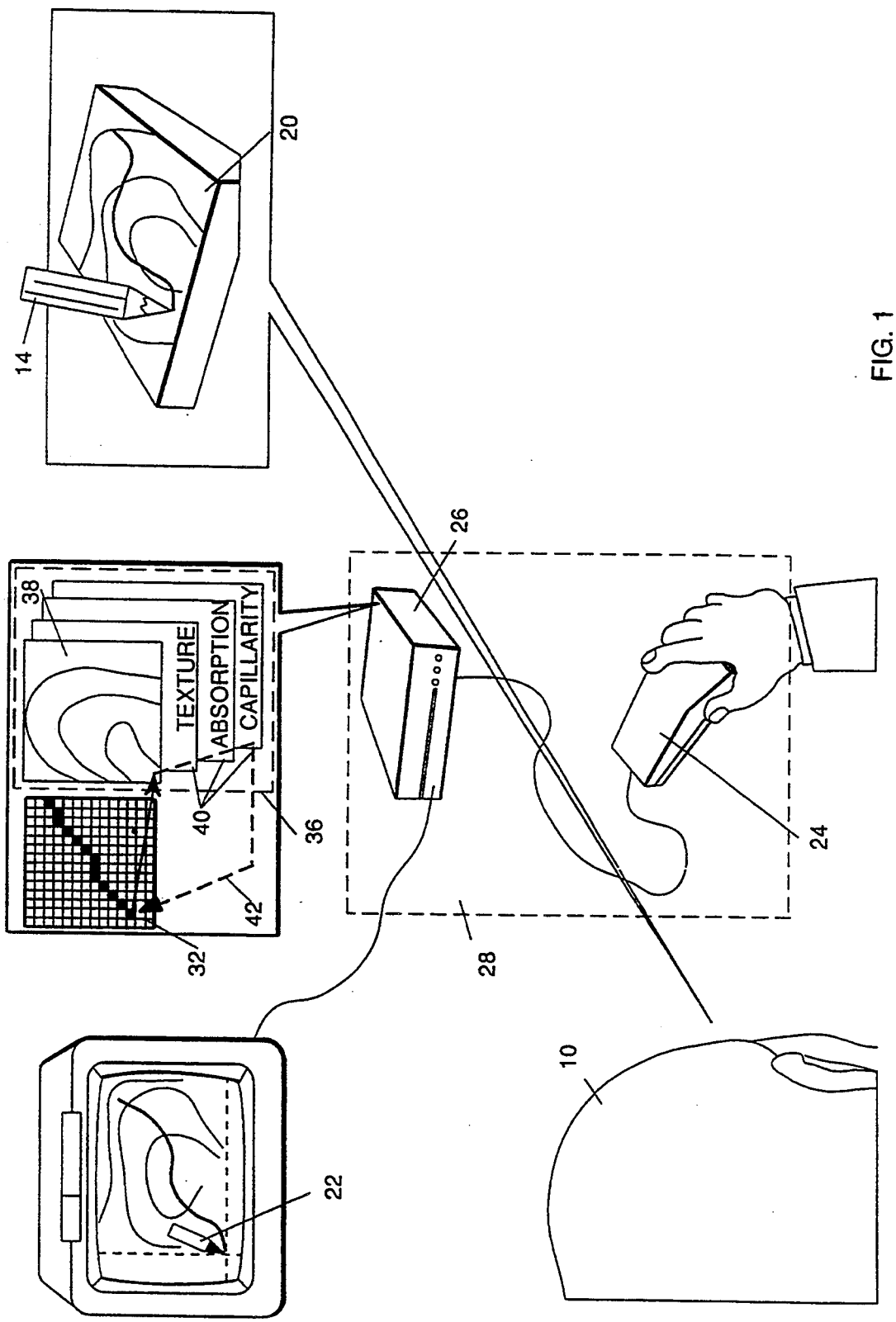
FIG. 1A is an illustration of a prior art method for creating graphic images.
FIG. 1B is a pictorial illustration of a method for creating graphic products which include an emulated substrate, operative in accordance with the present invention.

Reference is now made to FIG. 1B which illustrates a method and apparatus for emulating graphic products which include substrates, operative in accordance with the present invention.

The present invention emulates the cooperation of an image with a substrate to form a graphic product. In a graphic product, the particular properties of the substrate will affect the look of the image. A graphic product formed on wood will look slightly different than a graphic product with the same image formed on glass because the substrate and the image interact.

Similarly, the present invention emulates the cooperation of a color medium with an image. The type of color medium chosen will affect the look of the image. A graphic product formed on paper with watercolors appears different than one formed with oil-based paints.

In accordance with the present invention, the cooperation is emulated with both an already available image, such as a scanned image, and an image which is being created.

In accordance with an embodiment of the present invention, an already available image is reproduced in cooperation with a selected substrate thereby to produce a new image which includes the affects of the selected substrate. The available image can be reproduced with a number of different substrates, as desired, thereby producing a number of new images.

In accordance with an embodiment of the present invention, the operation of using an artistic tool 14 on a substrate 30 is emulated. This operation is shown in FIG. 1B as that which the operator 10 conceives while he is creating an image 32. In reality and similar to the prior apt illustrated in FIG. 1A, the operator 10 operates on a picture 34 of image 32 which is displayed on a display device 20. However, and in contrast to the prior art, the picture 34 is that of an image on substrate 30 and includes in it emulations of the cooperation of substrate 30 and tool 14 and, optionally, a color medium, such as paint, used to deliver color to the substrate 30.

Image 32 includes in it the visual effects of substrate 30 to a color being applied upon it. For example, if substrate 30 is wood and the color medium is a water color, then the grain of the wood will be visible through the applied color.

The creation operation, in this embodiment, is performed typically with an emulated tool. Each emulated tool emulates selected properties of one artistic tool 14 and is represented by its own icon 22.

In accordance with the present invention, image 32 is a representation of an image on a substrate. In this embodiment, image 32 is created in association with an emulated substrate 36, emulating substrate 30, which might be any kind of substrate, such as smooth paper, cloth, wood or a fibrous material. Emulated substrate 36 comprises at least one feature of the substrate 30, such as its "look", its amount of absorption of color and/or of liquid, its physical textural qualities, surface stiffness, frictional qualities, hardness and capillarity, as well as its physical structure. The features of substrate 30 are indicated in FIG. 1B as layers 38, however, it will be understood that this is by way of clarity of explanation only.

The "look" of the emulated substrate 36 is typically defined as a visual representation of substrate 30, shown in FIG. 1B as the first layer 38. The remaining layers 38 represent non-visual physical features which are important for emulating the interactions of substrate 30 with artistic tool 14.

For example, the substrate 30 being emulated in FIG. 1B by emulated substrate 36 is a wood material and thus, emulated substrate 36 includes four layers 38, representing the look, texture, liquid absorption and capillarity of substrate 30. Other substrates 30 may require a different number of layers 38.

As mentioned hereinabove, in this embodiment the image 32 is created in association with emulated substrate 36. As operator 10 moves the emulated tool, the interactions of artistic tool 14 with substrate 30 are emulated and the result of the interaction is represented in image 32. The interactions are shown by dotted line 40 which indicates that the interaction caused by the feature of each layer 38, other than the layer of the substrate look, is calculated for the current location of the emulated tool, as denoted by the icon 22. The result as it affects how the image will look is displayed in image 32, as indicated by dotted line 42.

It will be appreciated that substrate 30 is affected by the movement of artistic tool 14 along it. For example, a pen moving across a piece of wood will cause minute indentations in the wood. In another example, wherever oil paint is placed on paper the absorption of substrate 30 will be affected. In the latter case, substrate 30 is now a combination of paper and oil paint. Thus, substrate layers 38 can be updated at the same time that the results of the interactions are displayed in image 32.

In this embodiment, once the image 32 has been completed, it can be combined with the visual layer of substrate 36 (the substrate look) to produce picture 34 of the image 32 on a background of substrate 30. Alternately, it can be combined with the visual layer during production of the image. Picture 34 can be output in any suitable manner, such as printed or displayed on a display device, such as a monitor. Picture 34 can be stored in a storage device, such as a disk, or it can be provided to a transmission device for transmission to a suitable receiving device, such as a facsimile device, or to a television screen.

Figure 2:
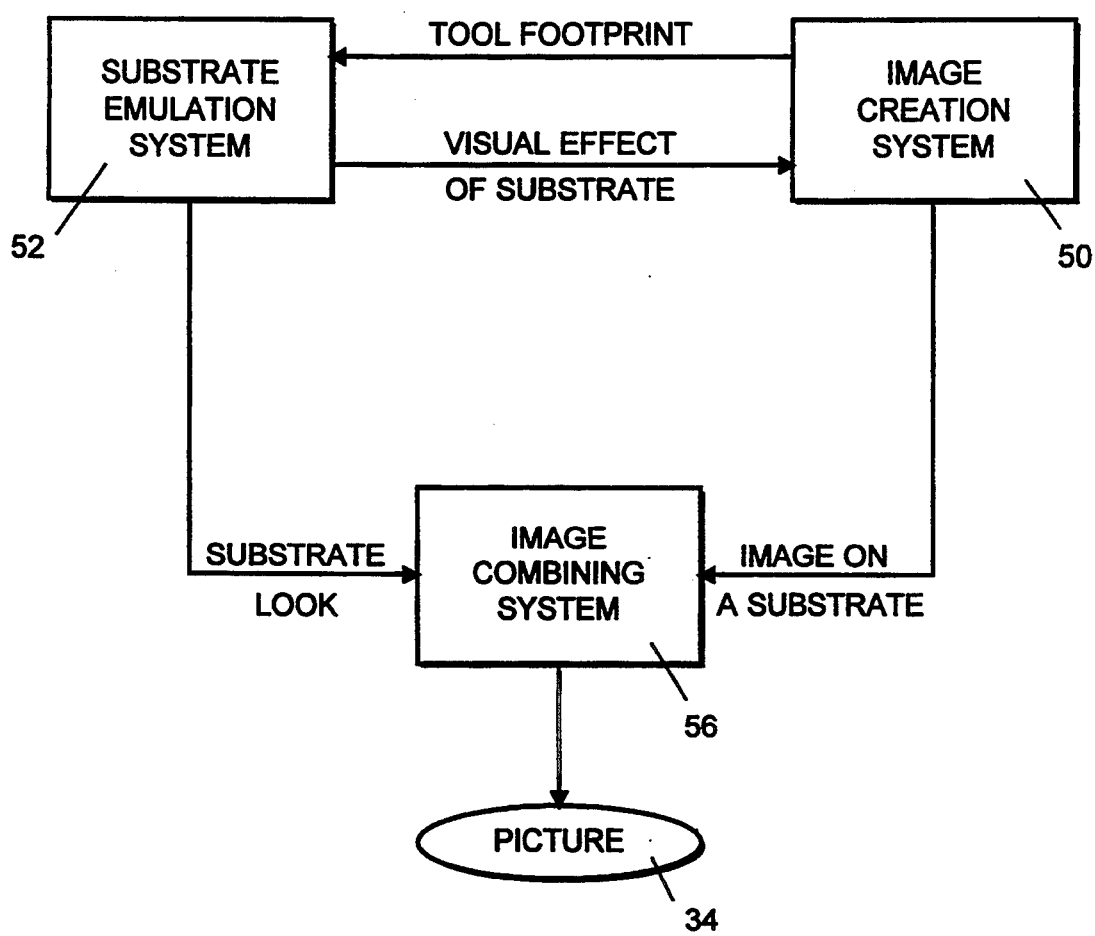
FIG. 2 is a block diagram illustration of a system implementing the method of FIG. 1B.

Reference is now made to FIG. 2 which illustrates, in block diagram form, a system for implementing the embodiment of the present invention shown in FIG. 1B. The system comprises an image creation system 50, such as the Scitex Prisma System manufactured by Scitex Corporation Ltd. of Herzlia Israel, and a substrate emulation system 52, described in more detail hereinbelow.

The two systems 50 and 52 typically cooperate to create an image 32 which includes in it the interactions of substrate 30 with artistic tool 14. System 52 provides the image creating information and system 50 provides the substrate emulation information. To this end, system 50 includes means for creating emulated substrate 36 and its features 38 and means for emulating the interactions of artistic tool 14 with substrate 30 while image 32 is being created.

The systems 50 and 52 can be either comprised of software or hardware systems or any suitable combination of hardware and software elements.

As shown in FIG. 2, systems 50 and 52 operate together and each affects the output of the other. The image creation system 50 produces a "tool footprint", which consists of a multiplicity of features of the emulated tool which emulate the features of the artistic tool 14. These features typically include the width, and shape of the emulated tool as well as other particular properties of the tool 14, such as hardness, pressure, for the smudge tool, or the shape of the drops for an airbrush. The tool footprint can also include features of the color medium, such as its color and its density.

A generic tool footprint might be defined as having a collection of quantified features of the artistic tool. For example, the following features may be included: the family of the artistic tool, such as air blower or pulled along a surface, the thickness of the artistic tool and the amount of granularity in the color medium, both of which may have a range, and the type of color medium, such as fluid or solid.

A tool footprint defining a specific emulated tool might then have values fop each of the abovementioned features. For example, an emulated crayon might be defined as having a family value of being pulled along a surface, a high value of thickness and a low value of granularity and a color medium type of solid. An emulated airbrush with a watercolor, on the other hand, might have a family of air blowing, a low thickness and a high granularity and a color medium type of fluid.

It will be appreciated that the tool footprint in the present invention includes features of the tool 14 which are not typically included in prior art graphics systems.

Using the tool footprint, the substrate emulation system 52 emulates the interaction of the artistic tool 14 with the substrate 30 and produces the visual effect of the interaction as well as an updated version of emulated substrate 36. The visual effect is then incorporated into image 32 by system 50.

Upon completion of image 32, the substrate look and image 32 are combined together in an image combining system 56, such as an algorithm processor, for producing the picture 34.

It will be noted that image 32 can be stored in bitmap or vector format. In embodiments using a vector format, other substrates 30 can be emulated with the same basic image. A new image 32 is produced in conjunction with each alternative substrate 30. In such a system, the image creation system 50 repeats, in order, the image creation steps performed to create the original image 32. At each step, system 50 sends the tool footprint to the substrate emulation system 52 for production of the visual effect of the new substrate which is then incorporated into the new image 32.

Figure 3A:
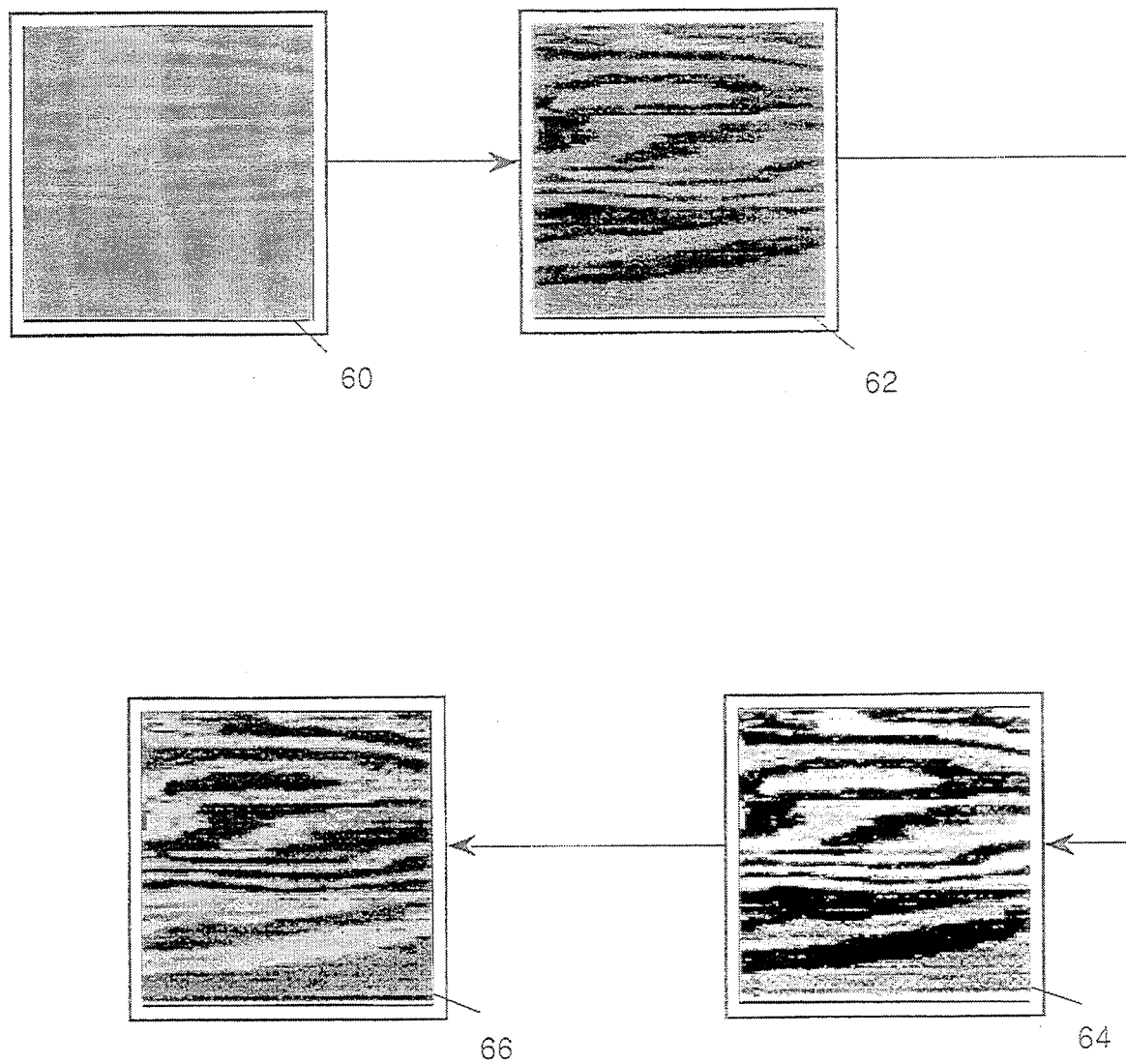
FIGS. 3A and 3B are pictorial illustrations of two alternative methods for producing a multiplicity of characteristic layers of a substrate.
Figure 3B:
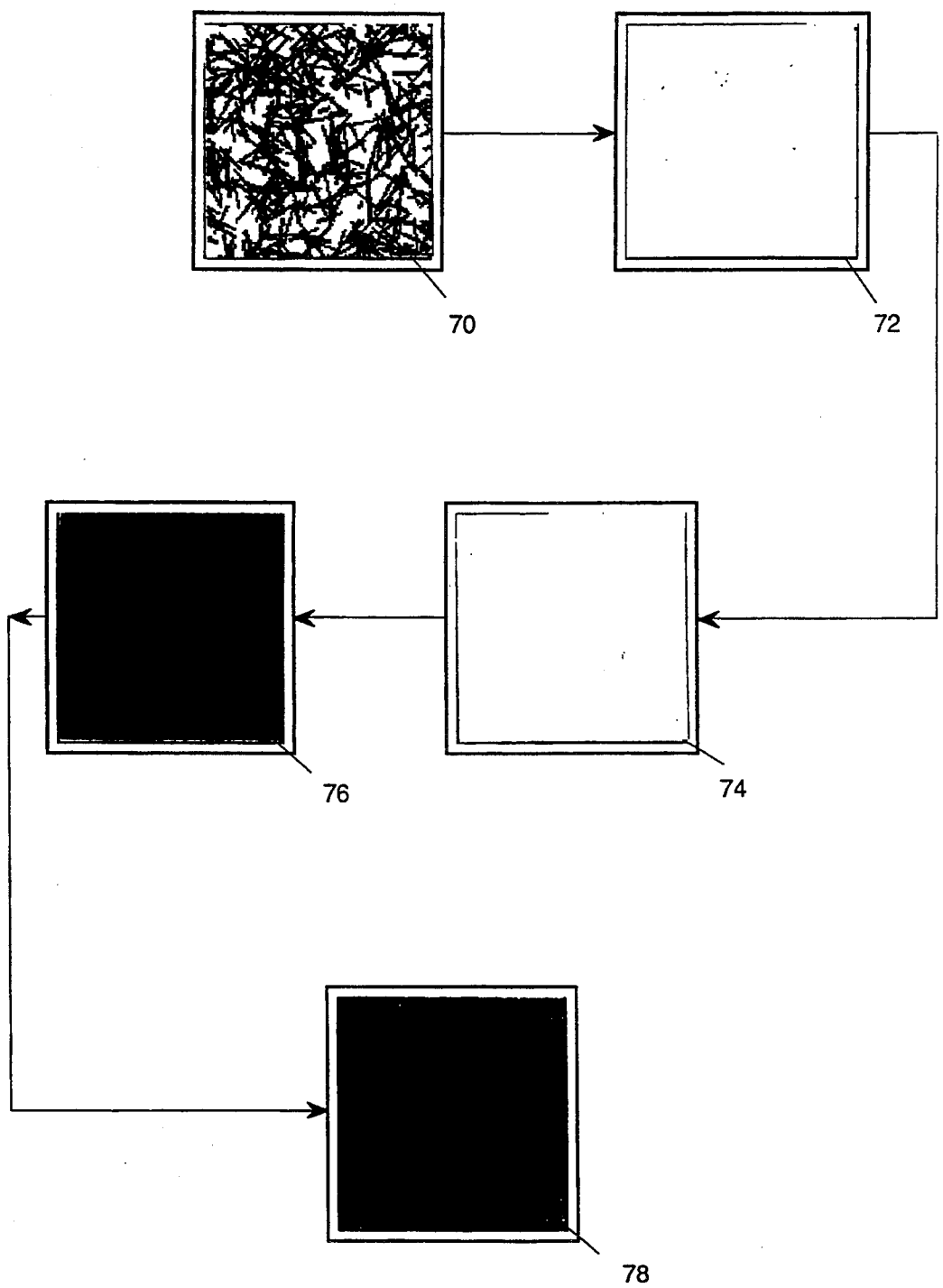
Figure 3C:
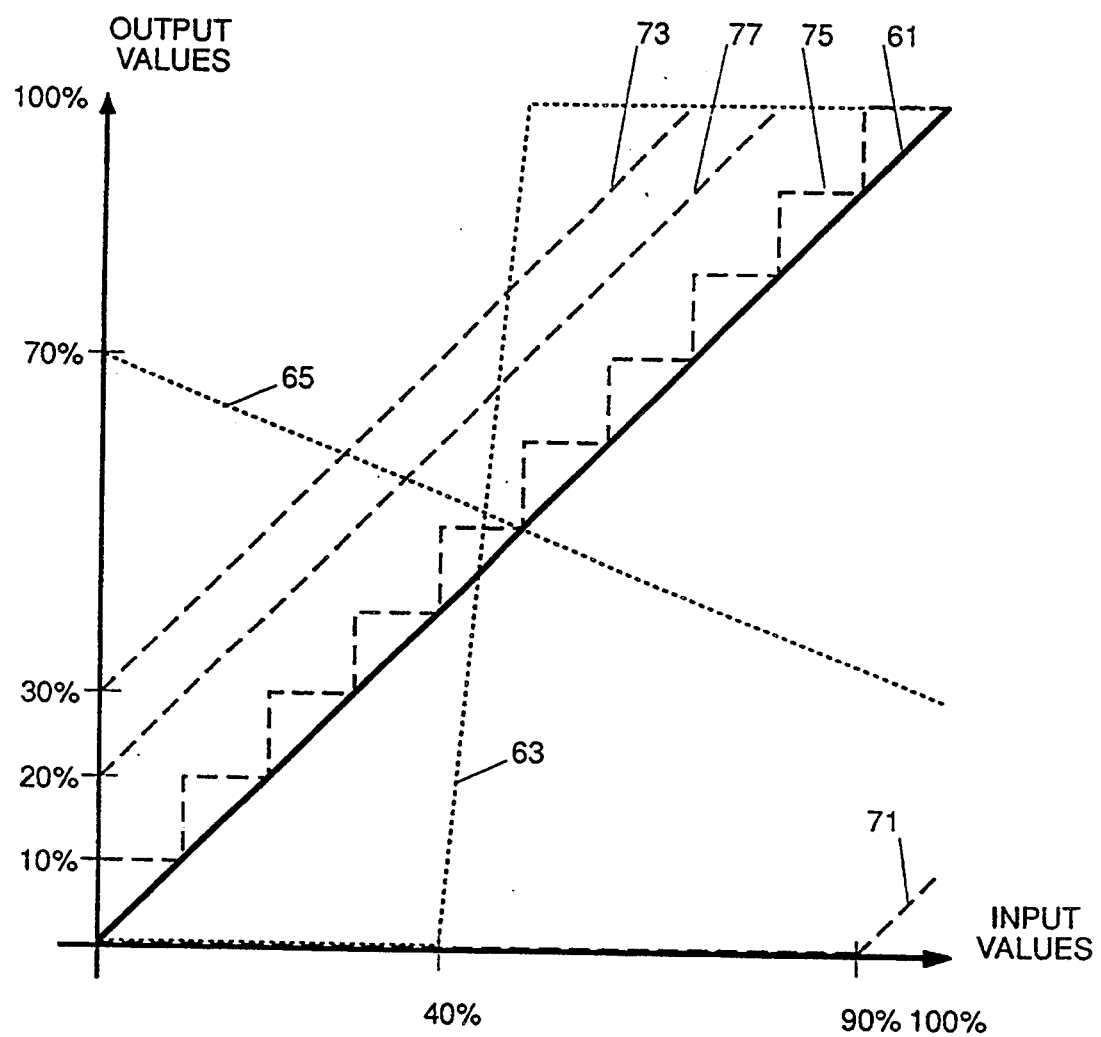
FIG. 3C is a graphical illustration useful in understanding the operations performed in producing the multiplicity of characteristic layers in FIGS. 3A and 3B.

Reference is now made to FIGS. 3A and 3B, which illustrate two alternative exemplary methods for producing two different emulated substrates 36, and to FIG. 3C which is utilized in the methods of FIGS. 3A and 3B. In FIG. 3A, the substrate 30 being emulated is wood and in FIG. 3B, the substrate 30 is an artificial fibrous material. FIG. 3C is a gradation graph.

The method of FIG. 3A begins by scanning, via any scanning method, a picture 60 of a wood surface. This produces the look layer which is typically a color picture, comprised of a multiplicity of color separations and typically stored in the Cyan Magenta Yellow Black (CMYK) color coordinate system.

To produce a texture layer 62, it is noted that the texture of a piece of wood comes from the minute hills and valleys. The texture layer indicates the changing height of substrate 30. In other words, the texture layer indicates where on substrate 30 the artistic tool 14 will touch first. To produce the texture layer, the look layer is transformed into the Luminance Hue Saturation (LHS) color coordinate system. The hue and saturation separations are then ignored and the luminance separation is sharpened by filtering with the following eight bit neighborhood matrix:

$$\begin{matrix} 0 & -1 & 0 \\ -1 & +5 & -1 \\ 0 & -1 & 0 \end{matrix} \qquad (1)$$

The result is an image typically formed of a plurality grey levels. For example, the texture layer 62 can be defined as an eight bit picture with 256 grey levels.

The hardest sections of a piece of wood are those on the edges of the yearly rings. The rings are typically the darkest part of the look layer 60 and the higher portions of the texture layer 62. Thus, a hardness layer 64 is produced by filtering the texture layer 62 for contrast in accordance with the gradation graph of FIG. 3C.

The abscissa of FIG. 3C is the grey level percentage of an input pixel and the ordinate is the grey level percentage of an output pixel. If no contrast is desired, the input percentage is the same as the output percentage, as noted by line 61. The remaining graphs are input-output relationships used in the following discussion.

For producing hardness layer 64, the hills of the texture layer 62 are of interest. Therefore, an input-output relationship of a graduated threshold, such as in line 63 of FIG. 3C, is desired. For input values below 40%, the output value is 0%, for input values above 60%, the output value is 100% and between 40% and 60% there is a slightly sloped line. The result is a grey level picture.

Finally, the absorbent portions of a piece wood are those which are away from the edges of the yearly rings, or, in other words, those which are not hard. An absorption layer 66 can be produced from the hardness layer 64 by blurring and inverting the hardness layer 64. This is performed through filtering the hardness layer 64 with the following matrix and filtering the result in accordance with gradation line 65 of FIG. 3C.

$$\begin{matrix} 0 & +1 & 0 \\ +1 & -5 & +1 \\ 0 & +1 & 0 \end{matrix} \qquad (2)$$

In FIG. 3B, an emulated substrate 36 which emulates a substrate 30 which is an artificial fibrous, but not woven, material is created. Since fibrous materials can have random patterns, a random generator is typically utilized to generate a two-dimensional base 70 on which is a random pattern. Numerical random generators are described in Chapter 7 of the book *Numerical Recipes in C: The Art of Scientific Computing*, by William H. Press, Brian P. Flannery, Saul A. Teukolsky and William T. Vettering, published by The Press Syndicate of the University of Cambridge, Cambridge, England.

The base 70 can be a 1 bit binary image which is first converted to a 32 bit CMYK image. Since it is desired to have a bright finish look to the substrate 30, the base 70 is converted to a white image with a slight pattern by filtering in accordance with gradation line 71. Thus, most pixels will have an output value of 0% grey level, which is white, and those whose grey level is 90% or higher will receive output grey level values of 20% or lower. The resultant image is the look layer 72.

Since the fibrous material being emulated has very slight hills and valleys, in a manner similar to paper, its texture layer 74 has little contrast. To produce the texture layer 74, the look layer is filtered, in accordance with gradation line 71.

A hardness layer 76 is produced from texture layer 74 by noting that where the fibers are harder than the areas between the fibers and that the fibers are generally not very hard. Therefore, the hardness layer 76 is a darker version of texture layer 74, produced by filtering in accordance with gradation line 73.

An absorption layer 78 is produced from hardness layer 76 by noting that the fibers of the substrate will absorb more than the areas between them and that the fibers generally absorb 20% more than the areas between them. Thus, the hardness layer 76 is filtered in accordance with gradation line 75 and the result is sharpened by filtering in accordance with the following sharpening matrix:

$$\begin{matrix} 0 & -1 & 0 \\ -1 & +5 & -1 \\ 0 & -1 & 0 \end{matrix} \qquad (3)$$

It will be appreciated that the process of creation of an emulated substrate 36 involves knowledge of the properties of the substrate 30 being emulated. Generally, the process is a manual one; the operator 10 or a system developer has to understand the features of the substrate 30 to be emulated and from that understanding has to define which features are to be emulated. Once the feature layers have been defined, they can typically be produced from the visual layer.

It will be noted, however, that the substrate creation operation typically involves image processing of at least the look layer in order to produce the other layers.

As mentioned hereinabove, the substrate emulation system 52 receives the tool footprint from the image creation system 50 each time the emulated tool moves to a new location. With the tool footprint, the system 52 calculates the interaction of the emulated tool with the emulated substrate 36. The following discussion outlines the interactions for the texture and absorption layers.

Figure 4A:
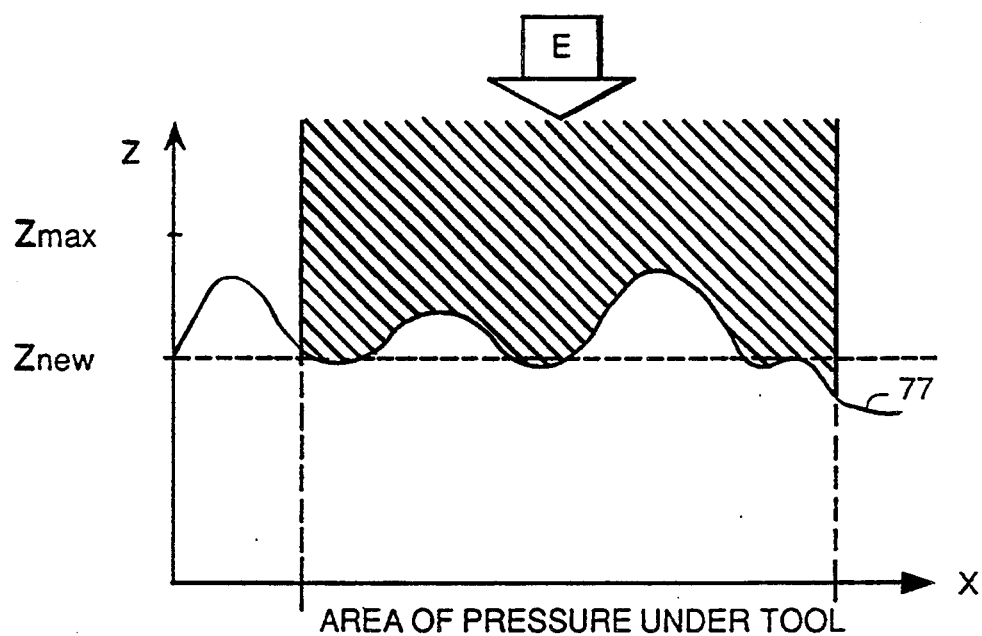
FIGS. 4A and 4B are useful in understanding a method of processing the texture layer.

The pixels of the texture layer are processed using information from the hardness layer. FIG. 4A, to which reference is now made, illustrates a slice through a portion of emulated substrate 36. In physical terms, the abscissa is the x direction of a surface 77 of the emulated substrate 36 and the ordinate is the height $Z(x,y)$ of the surface 77 at that location. For the slice shown, the y direction is constant. In terms of the texture layer 38, the abscissa is the x coordinate of a pixel and the ordinate is the pixel intensity.

The tool footprint defines the area of pressure under the emulated tool as well as the pressing "energy" E with which the tool is pressed. The center of the tool footprint is the pixel over which icon 22 is located.

Figure 4B:
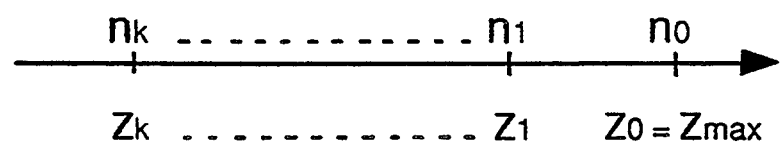

The interaction begins by sorting pixel triads $(x,y,Z(x,y))$ within the area of pressure by their heights, or $Z(x,y)$ values. The order is from the highest to the lowest. Thus, as shown in FIG. 4B to which reference is now briefly made, there are $n_k$ pixels whose height is $Z_k$ and $Z_o$ has the value of $Z_{max}$, the maximum height as shown in FIG. 4A.

The sorting enables the calculations to be performed level by level, where the kth level is defined as the level with a height of $Z_k$ and where, as mentioned above, the first level is the topmost one.

At each level, the resistance "energy" $R_k$ of the level is calculated and added to the accumulated resistance energy $R_a$ achieved at the previous level. The resistance energy $R_k$ is the sum of the energy needed to destroy the pixels in the $n_k$ triads wherein $Z(x,y) = Z_k$. Thus, $R_k$ is the sum of the $Q(x,y)$ values of the $n_k$ pixels, where $Q(x,y)$ is typically the hardness value of the (x,y) pixel of the hardness layer.

If the sum of $R_k$ and $R_a$ is less than the pressing energy E, indicating that the tool has energy enough to push the first k levels, then the energy $R_k$ is added to $R_a$ and the calculations continue to the next level until the sum is greater than E. At that point, a new height, $Z_{new}$ is calculated which is the height to which the tool will press. Its value is typically an interpolation between the current and the previous level. The following pseudocode outlines the above calculations:

1. Sort triads $(x,y,Z(x,y))$ within area of pressure.
2. Set $R_a$ to 0.
3. Set index k to 0.
4. Set $Z_{new}$ to $Z_k$.
5. Compute $R_k$=sum $(Q(x,y))$ for the $n_k$ triads with $Z(x,y)$ equal to $Z_k$.
6. If $R_k+R_a$ is less than E then
   a. set $R_a$ to $R_k+R_a$
   b. increase k by 1
   c. go to step 4
7. If $R_k+R_a$ is greater than E then a. set $Z_{new}=(Z_{k+1}*(E-R_a)+Z_k*(R_1+R_k-E))/R_k$ \qquad (4)

b. for all triads $(x,y,Z(x,y))$ with index less than or equal to k:
      1. paint the appropriate pixels (x,y) with the color which is in the tool footprint; and
      2. replace $Z(x,y)$ by $Z_{new}$.

Figure 5A:
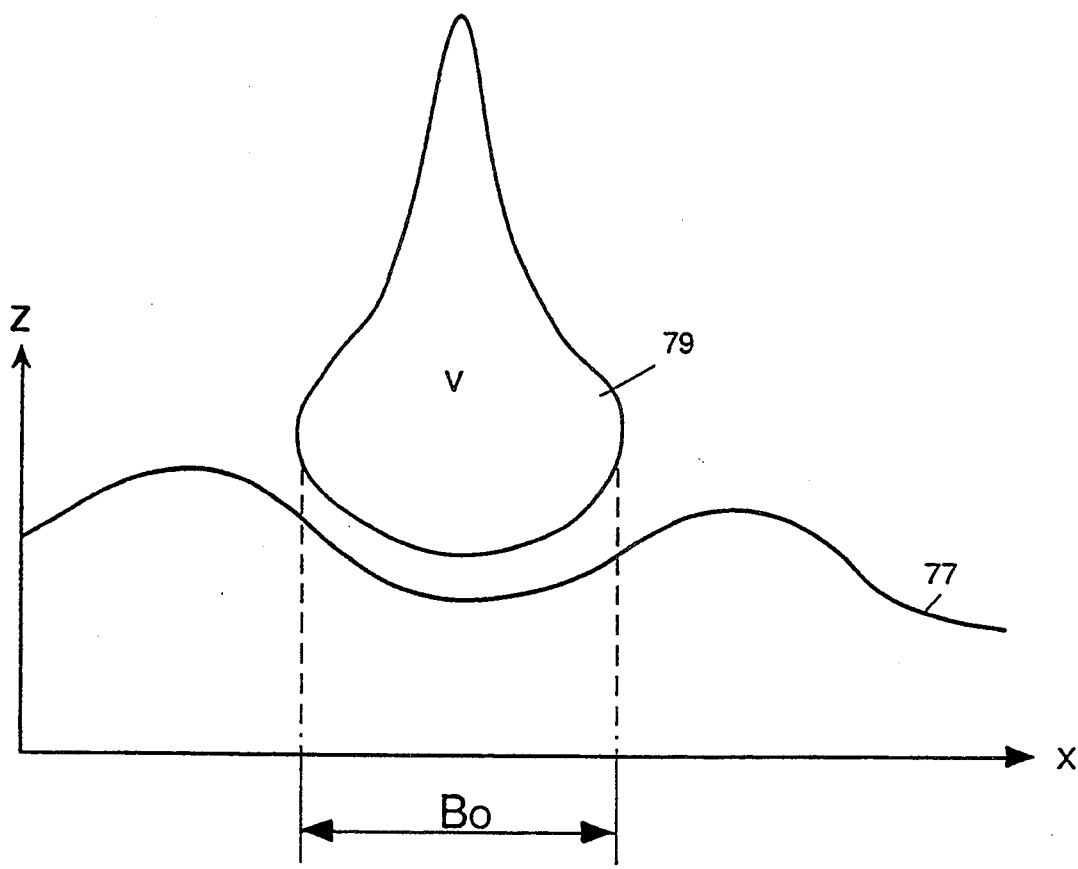
FIGS. 5A, 5B and 5C are useful in understanding a method of processing the absorption layer.
Figure 5B:
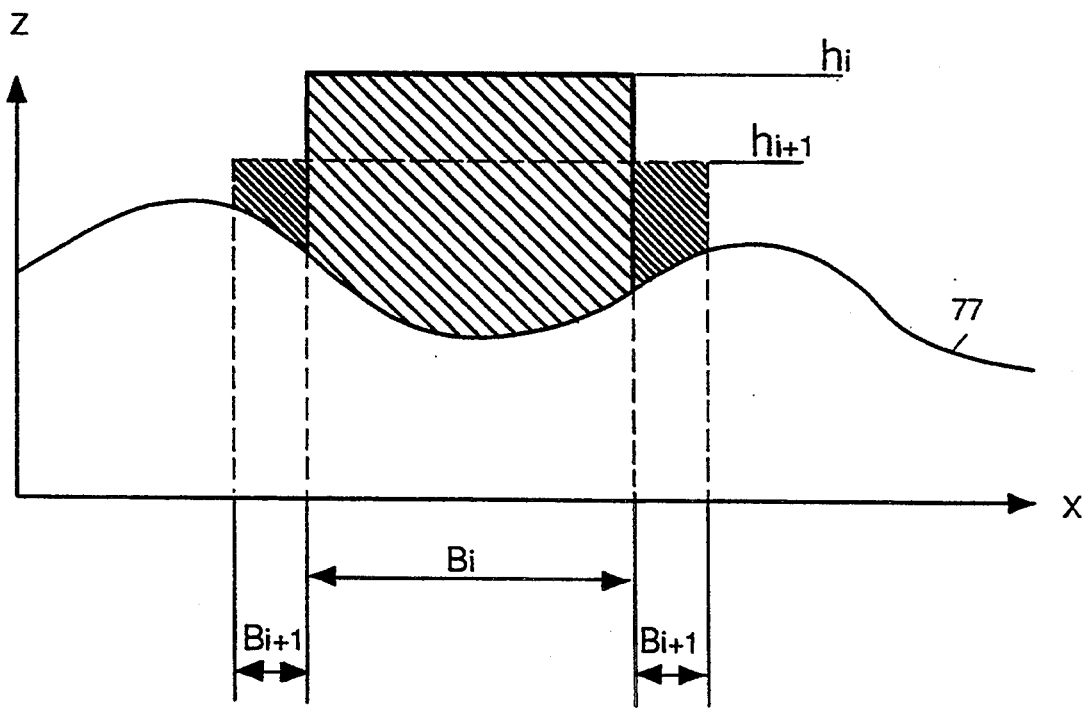
Figure 5C:
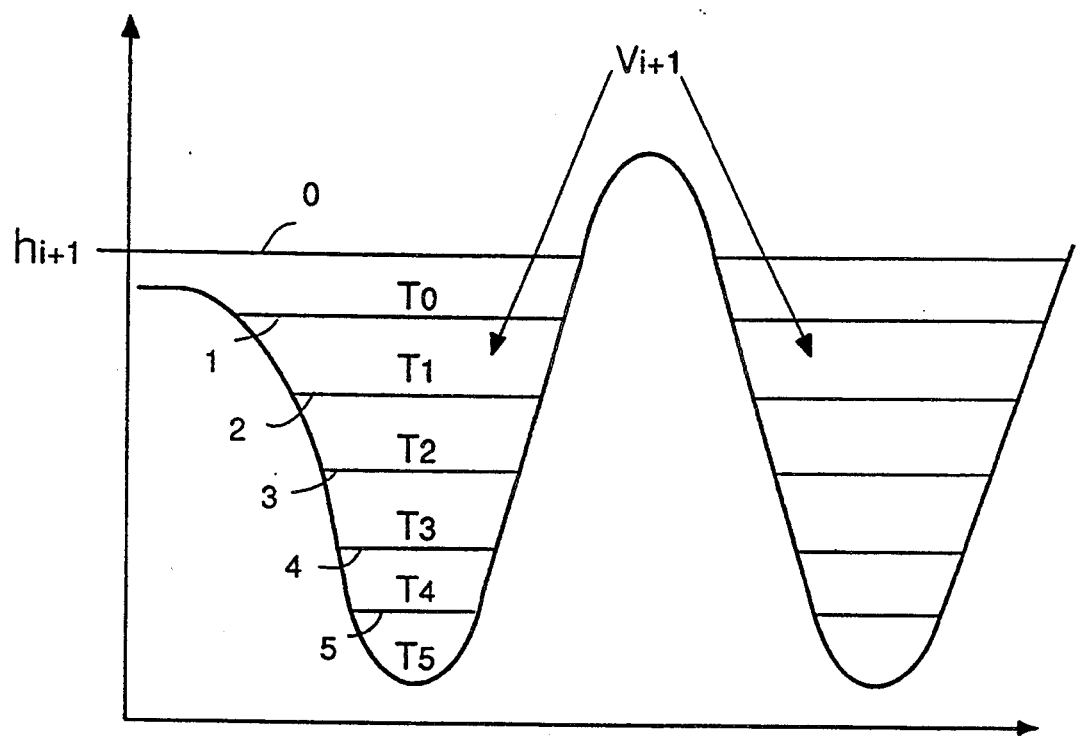

The pixels of the absorption layers are processed using information in the texture layer and in accordance with the following discussion and with FIGS. 5A, 5B and 5C, to which reference is now made. FIG. 5A illustrates, two-dimensionally, a drop 79 of color medium having a volume of V voxels (volume elements) dropping onto an area of the surface 77. The center of the drop 79 is located at the location of icon 22.

The pixels of the substrate 36 have absorption values $A(x,y)$ indicating that $A(x,y)$ voxels of ink can be absorbed during one calculation cycle.

The drop 79 initially lands on an area $B_o$ of the surface 77. The area $B_o$ is defined in the tool footprint and depends on the type of tool used and its properties. Those pixels in $B_o$ absorb a portion of the volume V in accordance with their absorption values $A(x,y)$. Thus, a volume $V_o$, which is the volume V less the sum of the $A(x,y)$ values of the pixels in $B_o$, is left to be absorbed by the neighboring pixels to $B_o$. Which neighboring pixels will absorb the remaining volume is calculated level by level in a manner similar to that described for the texture calculations above.

FIG. 5B shows the movement towards the neighboring pixels. At a given level, the height of the drop is $h_i$, the surface it covers is $B_i$ and its boundary is $B_{i+1}$, where the boundary is defined as the pixels bordering $B_i$. All pixels of the boundary $B_{i+1}$ which are below $h_i$, defined as the group $D_{i+1}$, will absorb part of the volume $V_i$ in accordance with their absorbency values $A(x,y)$. The remaining volume is calculated, as is the new height of the drop $h_{i+1}$. The calculations continue until their all of V is absorbed.

The following pseudocode outlines the above calculations:

1. Sort triads $(x,y,Z(x,y))$ by their heights and define variables $T_i$ as the number of triads with height $Z_i$. $T_o$ is defined to be empty.
2. Set $h_o$, the height from which the drop 79 is dropped, to a large number
3. Set $B_o$ to footprint of drop 79.
4. Set index i to 0.
5. Compute $D_i$=subset of $B_i$, triads whose $Z(x,y)<h_i$
6. Using a brush algorithm, paint the each pixel belonging to $D_i$ using at least the color $C_{tool}$ of the tool footprint and optionally the absorption value $A(x,y)$ of each pixel in $D_i$, the previous color $C(x,y)$ at that pixel and a mask value. An example algorithm might be:

$$C(x,Y)_{new} = C_{tool}*A(x,y) + C(x,y)*(A_{max}-A(x,y))/A_{max} \quad (5)$$

7. Compute the number of voxels of ink which will be absorbed inside $B_i$ as follows:

$A_{i+1}$ = sum over $D_i$ of the $A(x,y)$ values in $D_i$

8. If $A_{i+1}$ is greater than or equal to $V_i$ then goto "end"

9. Set $V_{i+1} = V_i - A_{i+1}$

10. Sort triads $(x,y,Z(x,y))$ in $B_i$ by their heights and add them to the already sorted triads. Adjust the $T_i$ accordingly.

11. Compute the new height $h_{i+1}$ of the drop as follows:

a. set m=0

$$b.\ h_{i+1} = \frac{V_{i+1} + \sum_{k=0}^{m} k*T_k}{\sum_{k=0}^{m} T_k} \quad (6)$$

c. m=m+1 d. if m<h+1 goto step b

12. Compute the next boundary $B_{i+1}$ as the pixels which border $B_i$.

13. set i=i+1, goto step 5.

Equation 6 can be understood by referring to FIG. 5C which shows surface 77 with a dot at height $h_{i+1}$ and layers 0-5 with numbers of pixels per layer $T_0$, $T_1$, $T_2$, $T_3$, $T_4$ and $T_5$. The volume $V_{i+1}$ is defined as the sum of the number $T_i$ of pixels at each layer multiplied by the height of the layer, being i, for all the layers. Thus, $$V_{i+1} = \sum_{k=0}^{m} (h_{i+1} - k)*T_k \quad (7)$$

Equation 6 follows from equation 7.

FIGS. 6-10 detail the look of an image resulting from the cooperation between the image and the substrate as a result, respectively, of the texture, absorbency, surface stiffness, friction and structural features of a substrate 30.

Figure 6C:
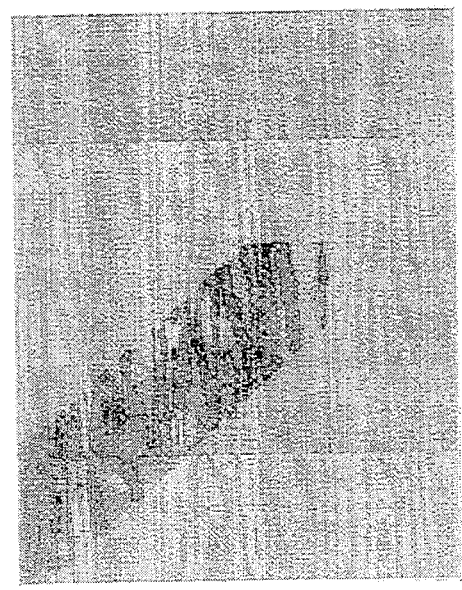
FIGS. 6A, 6B and 6C are three color illustrations of the effects of the texture of a substrate on an image.
Figure 6A:
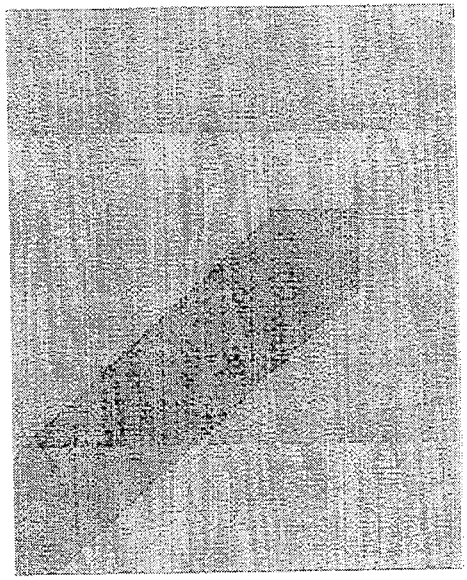
Figure 6B:
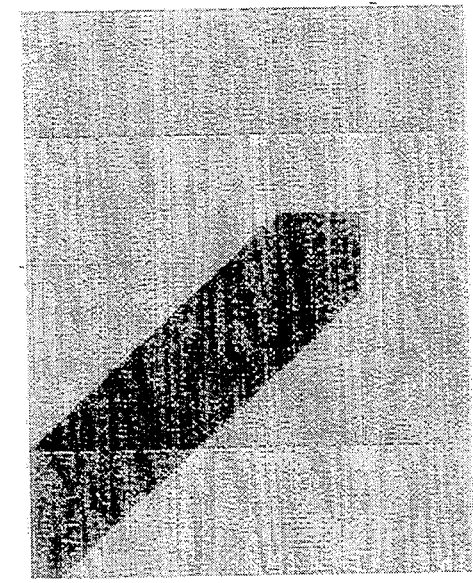

FIGS. 6A, 6B and 6C emulate three different textural interactions of an artistic tool 14 which is a blue pencil with a substrate 30 of wood. The blue pencil moves from the upper left corner towards the lower right corner. It will be noted that the substrate look is included in these illustrations.

The texture of a substrate 30 is defined as the locations and heights of the hills and valleys of the substrate 30. As mentioned hereinabove, the extent of the interaction between the substrate 30 and the artistic tool 14 depends on the height and hardness of the surface of the substrate 30. Since a pencil is relatively hard, it will deposit a lot of color on the hills of the wood and little color on the valleys. This is illustrated in FIG. 6A.

If the tool 14 is a paintbrush which has a liquid color medium, the interaction typically is different. The valleys receive more color and the hills less.

FIG. 6B emulates the fact that the texture affects the continuity of movement of the tool 14. Because a pencil has a tip with a well defined shape and due to the hill-valley texture of wood, the pencil typically does not move across the wood with a constant speed, nor is its path perfectly straight. This can be seen in FIG. 6B.

If the color medium of the tool does not seal the surface of the substrate 30, as it does in FIG. 6A and 6B, the color medium will interact with the substrate 30 and produce a color which is the combination of the color of the color medium and of the color of the surface of the substrate 30. This typically occurs with watercolors rather than crayons and is shown in FIG. 6C.

Figure 7A:
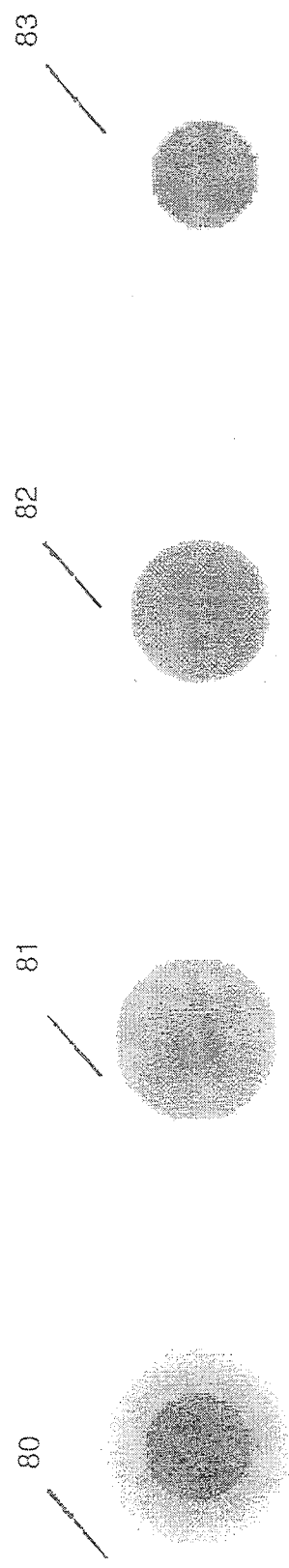
FIGS. 7A and 7B are color illustrations of four dots indicating the effects of different types of substrate absorbency.
Figure 7B:
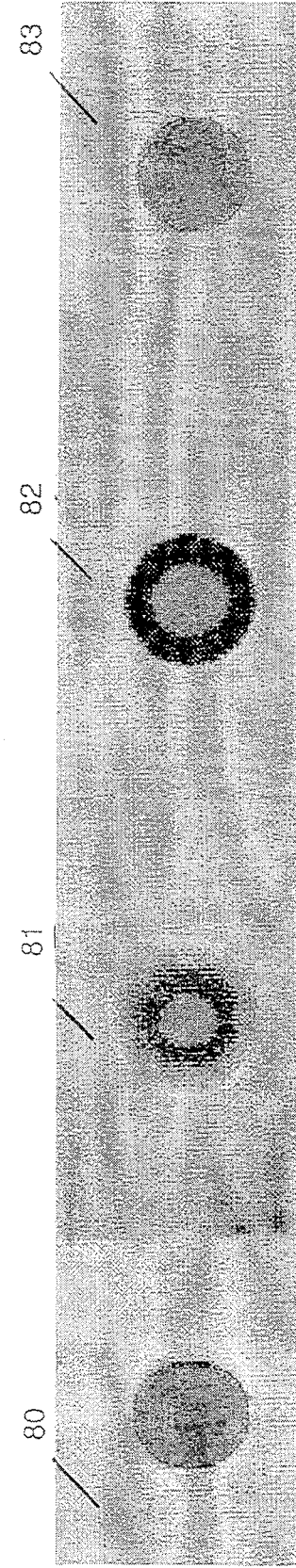

FIGS. 7A, 7B, 7C, 7D, 7E, 7F and 7G emulate the effects of differing absorbency on the resultant image 32. In FIGS. 7A and 7B there are four dots 80, 81, 82 and 83. In each of the dots 80-83, the color medium has the same density; the differing dot shapes are due to differing absorbency levels on the part of the substrate 30. The density of the color medium is part of the tool footprint and is defined in the image creation system 50. FIG. 7A shows the absorbency without the substrate look, FIG. 7A shows it with the substrate look, for a wood substrate.

Figure 7C:
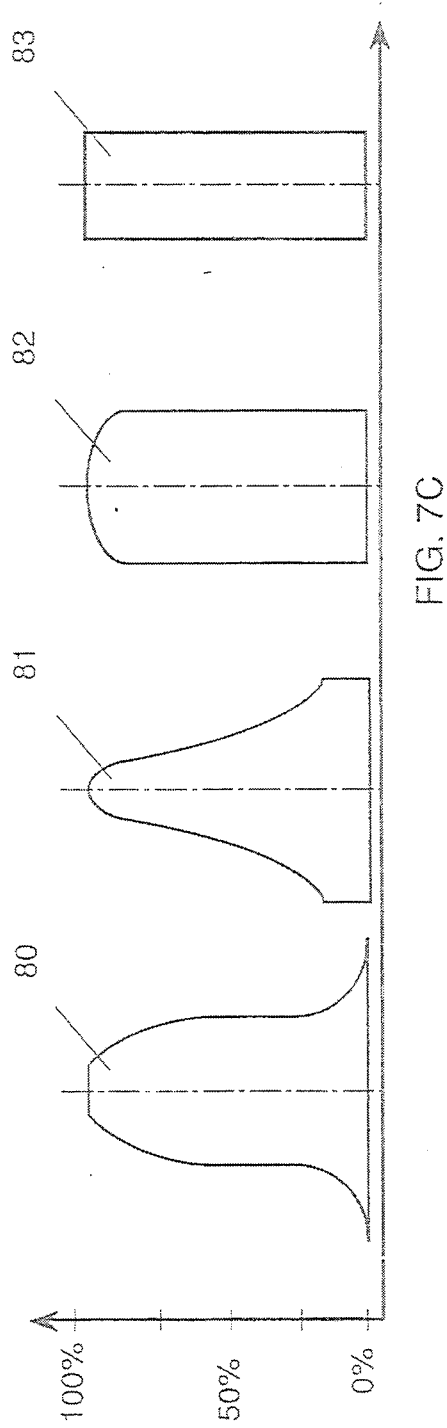
FIG. 7C is a graphical illustration of the absorbency properties of the four dots of FIGS. 7A and 7B.

FIG. 7C illustrates two-dimensional absorbency diagrams for each of the dots 81-83, it being understood that the absorbency is symmetric in the x and y directions. The ordinate is the x coordinate and the abscissa is the absorption percentage.

It can be seen that dot 83 has a constant absorption percentage throughout the dot. The absorption of dot 82 varies slowly with a small variance over the dot. Dots 80 and 81 have sharp changes in percentage at a predetermined distance from the center of the dot. Dot 80 has a constant absorption percentage near the center which later changes precipitously; dot 81 changes absorption almost immediately.

A color medium which has been placed on a substrate 30 can affect the absorbency of the substrate. This is emulated in FIGS. 7D-7G. The extent to which the absorbency of the substrate is affected depends both on the absorbency of the substrate and the density and extent of sealing of the color medium. These parameters are defined by the operator 10.

Figure 7G:
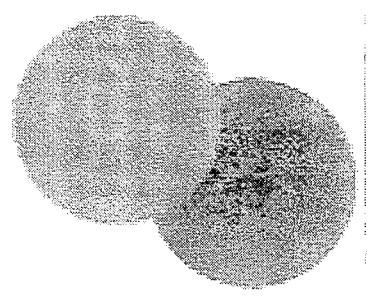
FIGS. 7D, 7E, 7F and 7G are color illustrations of the effects of the absorbency of four different types of color media.
Figure 7F:
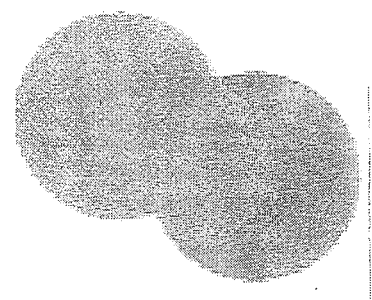
Figure 7E:
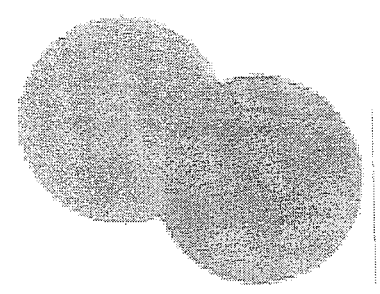
Figure 7D:
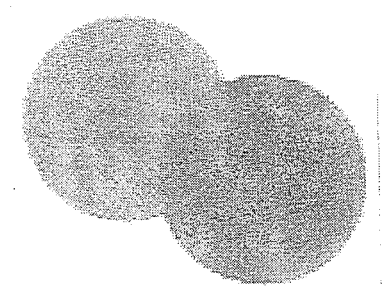

In each of the FIGS. 7D-7G, the blue color is placed on the substrate 30 first and the pink color medium is fresh. In FIG. 7D, the pink color medium mixes with the blue color medium only in the area of intersection. This is similar to the operation of magic markers. In FIG. 7E, neither color mixes with the other, nor do they overlap each other. Due to surface tension, the blue color medium pushes away the pink color medium such that neither dot is fully circular. This emulates wet oil-based paint.

In FIG. 7F the pink color medium spreads across the blue color medium. This typically occurs with fresh water colors. In FIG. 7G, the two color media do not mix at all, as typically occurs with crayons.

Figure 8A:
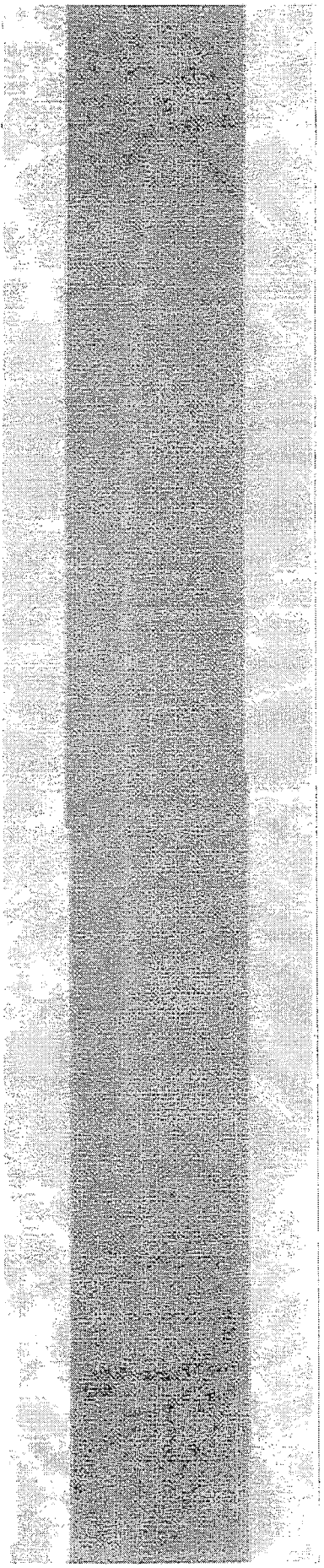
FIGS. 8A and 8B are color illustrations of the effects of the stiffness of the substrate surface with respect to an identical artistic tool.
Figure 8B:
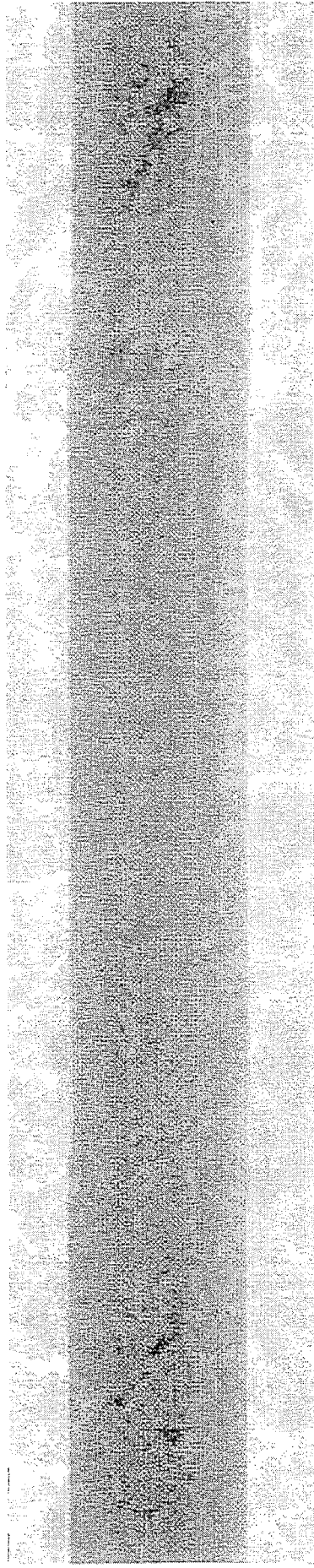

Reference is now made to FIGS. 8A and 8B which emulate the effects of the surface stiffness. The interaction between the tip of tool 14 and the surface of substrate 30 effects the width of the line which is produced when moving the tool 14 along substrate 30 as well as the degree of interaction.

FIG. 8A emulates the results of moving a tool 14 with a sharp and uniform tip along a path on a hard surface. The color medium is placed uniformly on the substrate. FIG. 8B emulates the results with a tool 14 which has a sharp tip on a soft surface. The color medium is thickly placed along the center of the path and thinly placed on the sides of the path.

Reference is now made to FIGS. 9A, 9B, 9C and 9D which emulates the effects of friction between the tip of tool 14 and the surface of a substrate 30 which is similar to wallpaper. The amount of friction depends on the hardness of the substrate 30 and of the artistic tool 14 as well as on the texture of the substrate 30.

Figure 9A:
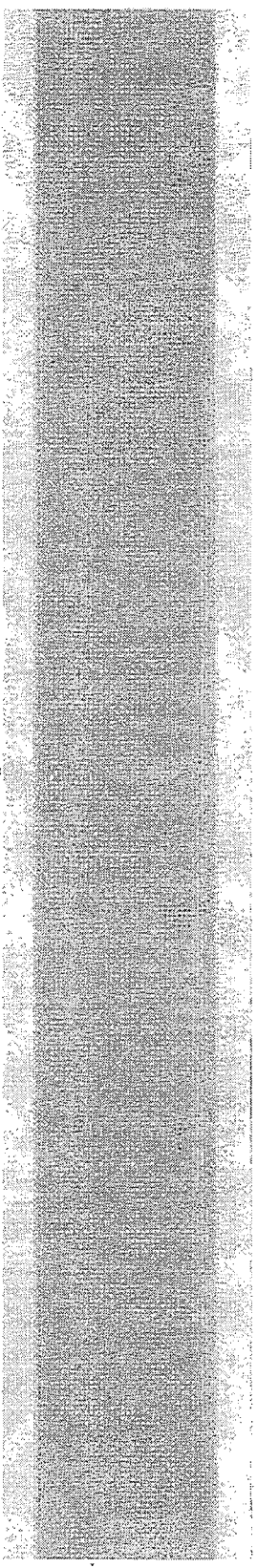
FIGS. 9A, 9B, 9C and 9D are color illustrations of the effects of friction between the artistic tool and the surface of the substrate for four different levels of friction.
Figure 9B:
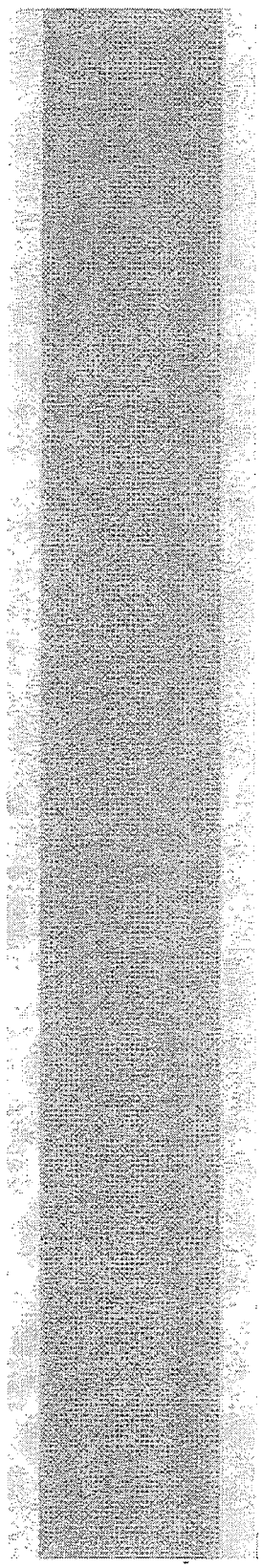

FIG. 9A emulates a situation with an average amount of friction which occurs when the artistic tool 14 is a felt tip pen. FIG. 9B emulates a high friction situation, such as when the wallpaper is hard like sandpaper. In this situation, the tool 14 places a lot of color medium onto the surface of substrate 30. This typically smooths out the hills and valleys of the substrate 30.

Figure 9C:
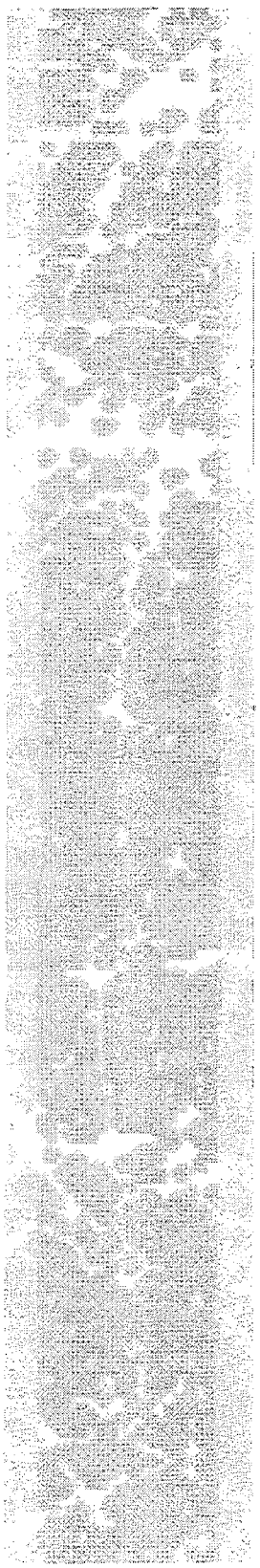

FIG. 9C emulates a low friction situation, where the wallpaper is as smooth as glass and the artistic tool 14 is a watercolor pencil. In this case, the interaction between tool 14 and substrate 30 is small and thus, little color medium is placed onto the surface of substrate 30. Typically, the color medium which is placed on the surface only is absorbed by the hills of the substrate.

Figure 9D:
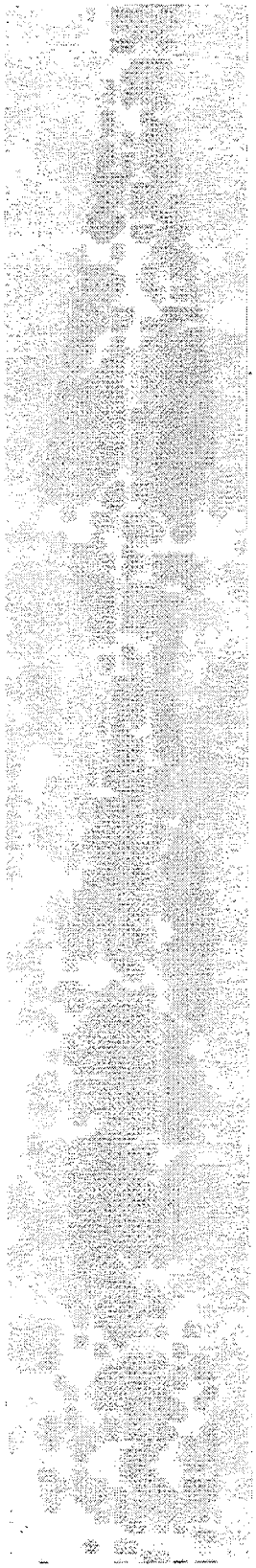

FIG. 9D also emulates a low friction situation in which the tool 14 is quickly drawn across the surface. In this case, the tip of tool 14 is likely to occasionally leave the surface of substrate 30 and thus, the color medium is placed on the surface in a non-uniform way.

Figure 10A:
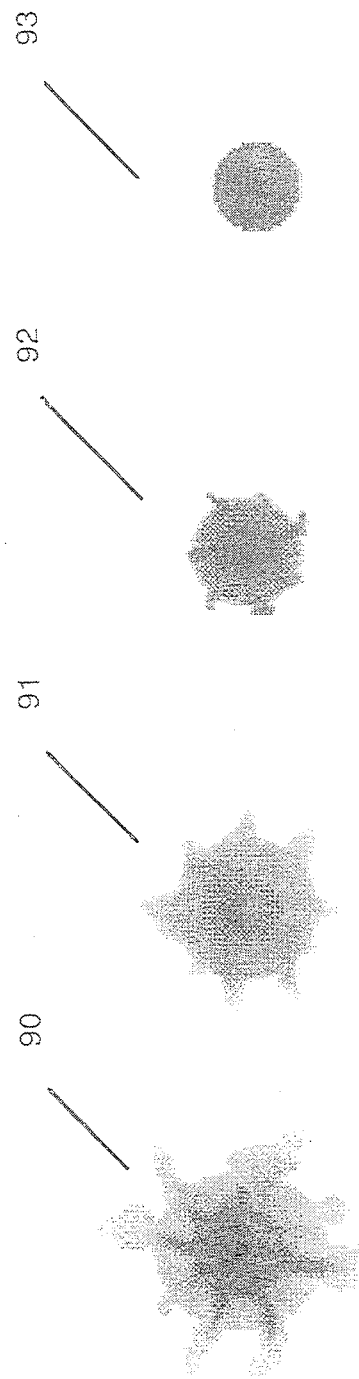
FIGS. 10A and 10B are color illustrations of the effects of the capillarity of a substrate on the absorbency of a color medium, for four different types of substrates.
Figure 10B:
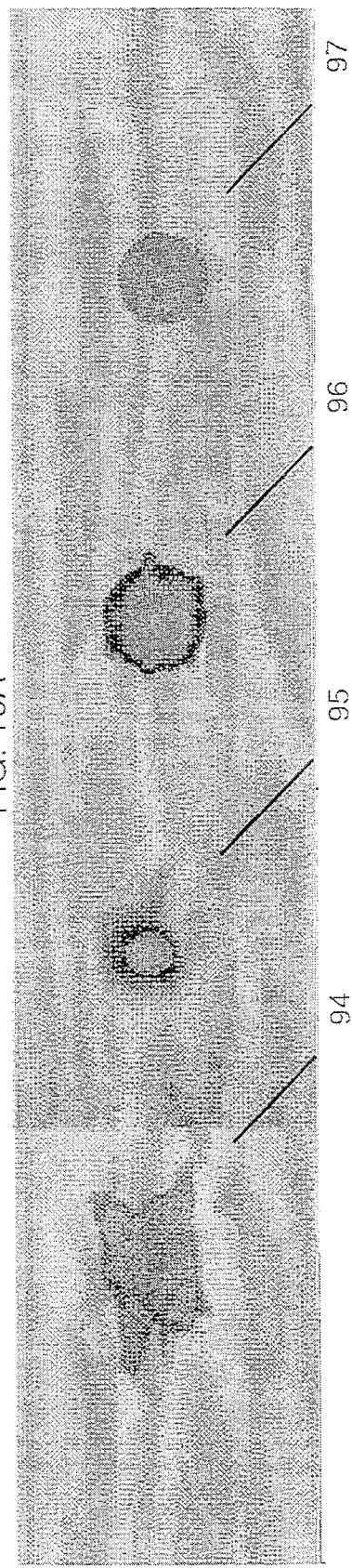

Reference is now made to FIGS. 10A and 10B which illustrate the effects of surface structure on the shape of the dots 80–83 of FIGS. 7A and 7B. The substrate 30 can have any kind of internal structure, such as a fibrous or crystalline structure. A fibrous structure will absorb the color medium along the fibers in accordance with the laws of capillarity. FIG. 10A illustrates the effects of the fibers of a substrate such as paper and FIG. 10B illustrates the effects of fibers of wood.

FIG. 10A has four dots 90, 91, 92 and 93, and FIG. 10B has four dots 94, 95, 96 and 97. The dots 90–97 have the same color medium respectively as dots 80–83 of FIGS. 7A and 7B. The substrate under dots 93 and 97 have no capillarity and thus resemble dots 83. However, the remaining dots are no longer perfectly round and their color is a mixture of the color of the color medium and of the substrate 30, whether paper (FIG. 10A) or wood (FIG. 10B).

Furthermore, the capillarity of paper is random whereas in wood it is in the direction of the grain of the wood. Thus, the dots 90–93 are symmetrical while the dots 94–97 extend in the direction of the grain of the wood.

Figure 11:
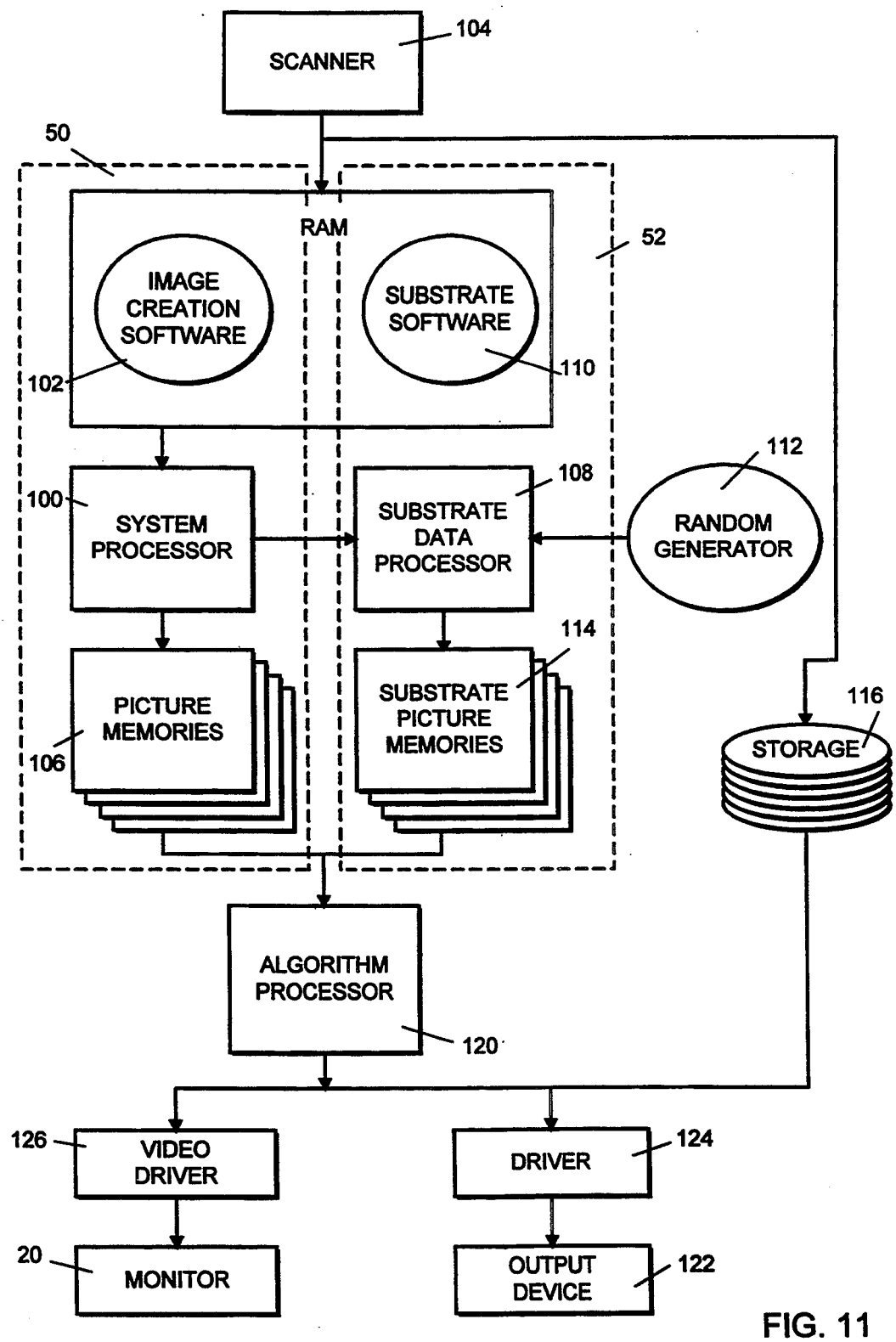
FIG. 11 is a block diagram illustration of hardware of the system of the present invention.

Reference is now made to FIG. 11 which illustrates, in block diagram form, preferred hardware for implementing the system of the embodiment of FIG. 2. The image creation system 50 typically comprises a system processor 100, for processing image creation software 102, such as the Adobe Photoshop or the Scitex Prisma System. Software 102 typically is operative to do the following:

import image data from a color separation scanner 104, such as the Smart Scanner manufactured by Scitex Corporation Ltd.;

enable a user to create images from his imagination using emulated tools; and merge together imported and created image data.

The images 32 generated by software 102 are stored in a plurality of picture memories 106 while the system is operative and on a physical storage medium 116, such as a magnetic tape or a disk drive, otherwise.

Substrate .emulation system 52 typically comprises a substrate data processor 108 for processing substrate software 110. Substrate data processor 108 typically utilizes a random generator 112, such as described in the book *Numerical Recipes in C: The Art of Scientific Computing*, in defining some of emulated substrates 36, as described hereinabove. Among other things, the substrate data processor 108 typically produces emulated substrate 36 which is typically stored in one of a plurality of substrate picture memories 114. Any layer 38 which is not described two-dimensionally (i.e. it is a constant over the substrate 36) is stored in a data file, stored on physical storage medium 116, and linked to the emulated substrate 36.

Software 110 is operative for defining a general type of emulated substrate for storage in a database. Software 110 is also operative to do the following:

1. define the parameters of a current emulated substrate 36 to be used with the current image, as described hereinabove with respect to FIGS. 3A and 3B;

2. update the image as a result of interactions of the chosen emulated tools with the emulated substrate 36, as described hereinabove with respect to FIGS. 4 and 5; and 3. continually update the substrate features as a result of those interactions, as described hereinabove with respect to FIGS. 4 and 5.

System processor 100 and substrate data processor 108 typically form part of a Central Processing Unit (CPU) (not shown). During operation, software 102 and software 110 are typically stored in a Random Access Memory (RAM) 120 of the CPU.

The hardware additionally comprises an algorithm processor 120 for combining the current image with the current substrate look layer and a printing output driver 124 for providing the combined picture to a printing output device 122. For output to monitor 20, the hardware comprises a video driver 126 for receiving the combined picture and for providing it to the monitor 20.

The algorithm processor 120 and the video driver 126 can be incorporated into a single unit, such as the VIP board of the Scitex Prisma System.

The algorithm processor 120 can operate on the finished image 32 and substrate look or it can continually operate on the image 32 as it is being produced.

Other output devices and drivers can be included in the system, as desired. For instance, the output picture can be transmitted to a facsimile device.

Reference is now made to FIG. 12 which illustrates the operation of the embodiment of the system of FIG. 2. The system begins by opening a new image file, step 130. Into the new image file an existent image, such as an image scanned by scanner 104, can be loaded. An existent emulated substrate 36 can also be loaded. This happens in step 132.

If it is desired to modify the emulated substrate 36, or to create a new one, in step 134 the emulated substrate 36 can be built. The process of building a substrate is described hereinabove with respect to FIGS. 3A and 3B and typically includes image processing techniques. Modifications of a substrate typically include changing the parameters of one or more layer. Thus, for example, the wood substrate of FIGS. 3A can be made harder by changing the values of the hardness layer.

Any modified or new emulated substrates 36 are stored, in step 136, in substrate picture memories 114 (FIG. 11).

In step 138, the desired graphics operation or operations are chosen. These can be any graphics operation, such as selecting an image or portion of an image to be pasted into the current image, selecting a fill method, an emulated tool, or a mask type. It can also include defining limits to the image workspace.

The substrate interactions can be performed with or without the substrate updating operations. Thus, if it is desired not to update the emulated substrate 36, the operation of step 140 will not include steps 7a and 7b2 of the texture processing and step 11 of the absorption processing. Step 142 of FIG. 12, on the other hand, includes the substrate updating operations.

It will be appreciated that steps 140 and 142 occur repeatedly for all the pixels over which emulated tool is moved. If it is desired to change the emulated tool or any other graphics operation, then the system returns to step 138, as indicated by the dotted line 143.

In step 144 the resultant image 32 and emulated substrate 36 are stored.

The picture 34 can be printed with or without the substrate look, as chosen in step 146. If it is desired to combine the image 32 with the substrate look, this happens in step 148 via the image combining system 56. The result is printed in step 150.

It will be appreciated by persons skilled in the art that the present invention is not limited to what has been particularly shown and described hereinabove. Rather the scope of the present invention is defined only by the claims which follow:

I claim:

1. A method for creating an emulation of a substrate, the emulated substrate comprising at least two data layers, the method comprising the steps of:
   generating and storing a digital representation of a first data layer of a substrate;
   attributing to said first data layer at least one characteristic of a first physical feature of said substrate;
   determining at least one characteristic of a second physical feature of said substrate;
   modifying the digital representation of said first layer for producing a digital representation of a second layer of said emulated substrate, based at least on one determined characteristic; and
   repeating said storing, attributing, determining and modifying, thereby emulating a plurality of data layers of said emulated substrate.

2. A method according to claim 1 wherein a location said substrate is represented by a corresponding location in the digital representations of any of said at least two data layers.

3. A method according to claim 2 wherein said first data layer represents the appearance and color of a surface of said substrate.

4. A method according to claim 3 including displaying the emulated surface of said substrate.

5. A method according to claim 2 wherein said modifying comprises modifying said digital representation pixel by pixel sequentially.

6. A method according to claim 2 wherein said modifying comprises modifying a part of the pixels of said digital representation sequentially.

7. A method according to claim 1 wherein said at least two data layers represent includes at least one of the following group:
   the appearance of the substrate;
   the color of the substrate;
   the texture of the substrate;
   the hardness of the substrate;
   the absorption of the substrate.

8. A method according to claim 1 and also comprising creating a digital representation of an interaction effect between the substrate and an artistic took operating on the substrate.

9. A method according to claim 1 and also comprising creating a digital representation of an interaction effect between the substrate and an image created on the substrate.

10. A method according to claim 1 wherein said generating includes generating a random pattern.

11. A method for creating an emulation of a substrate, the emulated substrate comprising at least two data layers, the method comprising the steps of:
   scanning a surface of the substrate to be emulated;
   generating and storing a digital representation thereof, thereby producing a first data layer of said emulated substrate;
   attributing to said first data layer at least one characteristic of a first physical feature of said substrate;
   determining at least one characteristic of a second physical feature of said substrate;
   modifying the digital representation of said first layer for producing a digital representation of a second layer of said emulated substrate, based at least on one determined characteristic; and
   repeating said storing, attributing, determining and modifying, thereby emulating a plurality of data layers of said emulated substrate.

12. A method according to claim 11 and also comprising creating a digital representation of an interaction effect between the substrate and an artistic tool operating on the substrate.

13. A method according to claim 11 and also comprising creating a digital representation of an interaction effect between the substrate and an image created on the substrate.

14. A method according to claim 11 wherein said at least two data layers represent a selected number of features from the following group:
   the appearance of said substrate;
   the color of said substrate;
   the texture of said substrate;
   the hardness of said substrate:
   the absorption of said substrate.

15. A method according to claim 14 including displaying the emulated appearance and color of said substrate.

16. A method according to claim 11 wherein a location of said substrate is represented by a corresponding location in the digital representations of any of said at least two data layers.

17. A method according to claim 16 wherein said modifying comprising the manipulating said digital representation pixel by pixel sequentially.

18. A method according to claim 16 wherein said modifying comprising the manipulating a part of the pixels of said digital representation sequentially.

19. A method for emulating the interaction of an artistic tool and a substrate, the method comprising the steps of:
   providing an emulated substrate comprising at least two data layers, each data layer comprising a digital representation thereof and a representation of at least one characteristic of a physical feature of said substrate;
   providing an emulated artistic tool;
   selecting a first data layer;
   applying said artistic tool to at least one desired location of the digital representation of said first data layer;
   determining an effect of the interaction between said digital representation and said emulated artistic tool based at least on the representation of one characteristic of said physical feature;

modifying said digital representation in accordance with said determined effect and storing the results thereof; and for said at least one location, repeating said steps of selecting, applying, determining, modifying and storing for a second selected data layer, thereby emulating the interaction of said artistic tool with said substrate.

20. A method according to claim 19 including displaying the result of said interaction.

21. A method according to claim 19 including providing a result of said interaction to an output device.

22. A method according to claim 19 wherein said location includes at least one pixel.

23. A method for emulating a graphic product of an image created on a substrate, wherein said image generally effects the visual appearance of said substrate, the method comprising the steps of:

providing an emulated substrate comprising at least two data layers, each data layer comprising a digital representation thereof and a representation of at least one characteristic of a physical feature of said substrate;

providing a digital representation of said image;

selecting a data layer of said emulated substrate;

modifying the digital representation of said data layer in accordance with an effect of the interaction between said digital representation and the digital representation of said image based at least on the representation of one characteristic of said physical feature;

determining the influence of the modified digital representation of said data layer on the visual appearance of said emulated substrate;

storing the result thereof; and repeating said steps of selecting, modifying, determining and storing for a second data layer, thereby producing an emulated version of said graphic product.

24. A method according to claim 23 including displaying the result of said interaction.

25. A method according to claim 23 including providing a result of said interaction to an output device.

26. Apparatus for creating an emulation of a substrate, the emulated substrate comprising at least two data layers, comprising:

apparatus operative to produce a digital representation of a first data layer of the emulated substrate;

a memory for storing the digital representation of said first data layer;

apparatus operative to attribute to said first data layer at least one characteristic representing a first physical feature of said substrate;

apparatus operative to determine at least one characteristic of a second physical feature of said substrate;

apparatus operative to modify the digital representation of said first data layer for producing a digital representation of a second data layer of said emulated substrate, based at least on one determined characteristic; and control means operative to repeat the operation of said apparatus operative to store, attribute, determine and modify, thereby emulating a plurality of data layers of said emulated substrate.

27. Apparatus according to claim 26 wherein a location of said substrate is represented by a corresponding location in the digital representations of any of said at least two data layers.

28. Apparatus according to claim 27 wherein said first data layers represents the appearance and color of a surface of said substrate.

29. Apparatus according to claim 28 including apparatus operative to display the emulated surface of said substrate.

30. Apparatus according to claim 27 wherein said apparatus operative to modify comprise apparatus operative to modify said digital representation pixel by pixel sequentially.

31. Apparatus according to claim 27 wherein said apparatus operative to modify comprise apparatus operative to modify a part of the pixels of said digital representation sequentially.

32. Apparatus according to claims 26 wherein said at least two data layers represent a selected number of features from the following group;
the appearance of said substrate;
the color of said substrate;
the texture of said substrate;
the hardness of said substrate;
the absorption of said substrate.

33. Apparatus according to claim 26 wherein said apparatus operative to produce includes apparatus operative to produce a random pattern.

34. Apparatus according to claim 26 and also comprising apparatus operative to create a digital representation of an interaction effect between the substrate and an artistic tool operating on the substrate.

35. Apparatus according to claim 26 and also comprising apparatus operative to create a digital representation of an interaction effect between the substrate and an image created on the substrate.

36. Apparatus for creating an emulation of a substrate, the emulated substrate comprising at least two data layers, comprising:

a scanning system for scanning a surface of the substrate to be emulated;

apparatus operative to produce a digital representation thereof, thereby producing a first data layer of said emulated substrate;

apparatus operative to store the digital representation of said first data layer;

apparatus operative to attribute to said first data layer at least one characteristic of a first physical feature of said substrate;

apparatus operative to determine at least one characteristic of a second physical feature of said substrate;

apparatus operative to modify the digital representation of said first data layer for producing a digital representation of a second data layer of said emulated substrate, based at least on one determined characteristic;

control means operative to repeat the operation of said apparatus operative to store, attribute, determine and modify, thereby emulating a plurality of data layers of said emulated substrate.

37. Apparatus according to claim 36 wherein a location of said substrate is represented by a corresponding location in the digital representations of any of said at least two data layers.

38. Apparatus according to claim 37 wherein said apparatus operative to modify comprises apparatus operative to modify said digital representation pixel by pixel sequentially.

39. Apparatus according to claim 37 wherein said apparatus operative to modify comprises apparatus operative to modify a part of the pixels of said digital representation sequentially.

40. Apparatus according to claim 56 wherein said at least two data layers represent a selected number of features from the following group:
the appearance of said substrate;
the color of said substrate;
the texture of said substrate;
the hardness of said substrate;
the absorption of said substrate.

41. Apparatus according to claim 40 including apparatus operative to display the emulated appearance and color of said substrate.

42. Apparatus according to claim 36 and also comprising apparatus operative to create a digital representation of an interaction effect between the substrate and an artistic tool operating on the substrate.

43. Apparatus according to claim 36 and also comprising apparatus operative to create a digital representation of an interaction effect between the substrate and an image created on the substrate.

44. Apparatus for emulating the interaction of an artistic tool and a substrate, comprising:
apparatus operative to provide an emulated substrate comprising at least two data layers, each data layer comprising a digital representation thereof and a representation of at least one characteristic of a physical feature of said substrate;
apparatus operative to provide an emulated artistic tool;
apparatus operative to select a first data layer;
apparatus operative to apply said artistic tool to at least one desired location of the digital representation of said first data layer;
apparatus operative to determine an effect of the interaction between said digital representation and said artistic tool based at least on the representation of one characteristic of said physical feature;
apparatus operative to modify said digital representation in accordance with said determined effect;
apparatus operative to store the results thereof; and
control means operative for said at least one location, to repeat the operation of said apparatus operative to select, determine, modify and store for a second selected data layer, thereby emulating the interaction of said artistic tool with said emulated substrate.

45. Apparatus according to claim 44 including apparatus operative to display the result of said interaction.

46. A method according to claim 44 including apparatus operative to provide a result of said interaction to an output device.

47. Apparatus according to claim 44 wherein said location includes at least one pixel.

48. Apparatus for emulating a graphic product of an image created on a substrate, wherein said image generally effects the visual appearance of said substrate, comprising:
apparatus operative to provide an emulated substrate comprising at least two data layers, each data layer comprising a digital representation thereof and a representation of at least one characteristic of a physical feature of said substrate;
apparatus operative to provide a digital representation of said image;
apparatus operative to select a data layer of said emulated substrate;
apparatus operative to modify the digital representation of said data layer in accordance with an effect of the interaction between said digital representation and the digital representation of said image based at least on the representation of one characteristic of said physical feature;
apparatus operative to determine the influence of the manipulated digital representation of said data layer on the visual appearance of said substrate;
a memory for storing the result thereof; and
control means operative to repeat the operation of said apparatus operative to select, modify, determine and store for a second data layer, thereby producing an emulated version of said graphic product.

49. Apparatus according to claim 48 including apparatus operative to display the result of said interaction.

50. Apparatus according to claim 48 including apparatus operative to provide a result of said interaction to an output device.

* * * * *